United States Patent
Periyannan et al.

(10) Patent No.: US 9,300,705 B2
(45) Date of Patent: Mar. 29, 2016

(54) METHODS AND SYSTEMS FOR INTERFACING HETEROGENEOUS ENDPOINTS AND WEB-BASED MEDIA SOURCES IN A VIDEO CONFERENCE

(71) Applicant: Blue Jeans Network, Mountain View, CA (US)

(72) Inventors: Alagu Periyannan, Palo Alto, CA (US); Prasad R. Mohire, Sunnyvale, CA (US); Michael Grupenhoff, Palo Alto, CA (US); Swaroop Kulkarni, San Jose, CA (US); Akshay Kumar Sridharan, Santa Clara, CA (US); Nithin A. Prakash, Bangalore (IN); Emmanuel Weber, San Jose, CA (US); Anand Raghavan, San Francisco, CA (US); Kelly Wong, Mountain View, CA (US)

(73) Assignee: Blue Jeans Network, Mountain View, CA (US)

( * ) Notice: Subject to any disclaimer, the term of this patent is extended or adjusted under 35 U.S.C. 154(b) by 190 days.

(21) Appl. No.: 14/217,275

(22) Filed: Mar. 17, 2014

(65) Prior Publication Data

US 2014/0313278 A1    Oct. 23, 2014

Related U.S. Application Data

(63) Continuation-in-part of application No. 13/105,684, filed on May 11, 2011, now Pat. No. 9,035,997.

(60) Provisional application No. 61/798,371, filed on Mar. 15, 2013, provisional application No. 61/798,497, filed on Mar. 15, 2013, provisional application No. 61/803,320, filed on Mar. 19, 2013, provisional application No. 61/803,325, filed on Mar. 19, 2013.

(51) Int. Cl.
| | |
|---|---|
| *H04N 7/14* | (2006.01) |
| *H04L 29/06* | (2006.01) |
| *H04N 5/265* | (2006.01) |
| *H04N 7/15* | (2006.01) |

(52) U.S. Cl.
CPC .............. *H04L 65/403* (2013.01); *H04N 5/265* (2013.01); *H04N 7/141* (2013.01); *H04N 7/152* (2013.01)

(58) Field of Classification Search
USPC ................... 348/14.01–14.16; 370/259–271, 370/351–357; 379/202.01
See application file for complete search history.

(56) References Cited

U.S. PATENT DOCUMENTS

| | | |
|---|---|---|
| 4,455,455 A | 6/1984 | Little |
| 5,530,472 A | 6/1996 | Bregman et al. |

(Continued)

FOREIGN PATENT DOCUMENTS

| | | |
|---|---|---|
| DE | 10358846 A1 | 7/2005 |
| EP | 0955765 A1 | 11/1999 |

(Continued)

OTHER PUBLICATIONS

Notice of Allowance dated Sep. 18, 2015, from U.S. Appl. No. 13/955,646, filed Jul. 31, 2013, 12 pgs.

(Continued)

*Primary Examiner* — Hemant Patel
(74) *Attorney, Agent, or Firm* — Ascenda Law Group, PC

(57) ABSTRACT

Described herein are methods and systems for interfacing heterogeneous endpoints and web-based media sources in a video conference. Interfacing heterogeneous endpoints can be challenging due to audio/video (A/V) streams being encoded in a format that is proprietary to a media provider of the A/V stream (e.g., format that is proprietary to Skype). To address such a challenge, a client application from the media provider may be installed at a virtual machine, and may be used to decode A/V streams that are encoded in a format proprietary to the media provider. Further, to display content from a web-based media source (e.g., YouTube) in a video conference, a browser may be installed at a virtual machine, and may be used to virtually render a media signal from the web-based media source, such virtually rendered media signal subsequently being captured and presented in a video conference.

10 Claims, 18 Drawing Sheets

(56) References Cited

U.S. PATENT DOCUMENTS

| | | | |
|---|---|---|---|
| 5,657,096 A | 8/1997 | Lukacs | |
| 5,867,579 A | 2/1999 | Saito | |
| 5,959,662 A | 9/1999 | Shaffer et al. | |
| 6,069,952 A | 5/2000 | Saito et al. | |
| 6,075,571 A | 6/2000 | Kuthyar et al. | |
| 6,330,022 B1 | 12/2001 | Seligmann | |
| 6,449,717 B1 | 9/2002 | Saito | |
| 6,584,077 B1 | 6/2003 | Polomski | |
| 6,693,663 B1 | 2/2004 | Harris | |
| 6,750,896 B2 | 6/2004 | McClure | |
| 6,831,676 B2 | 12/2004 | Monroe | |
| 6,873,654 B1 | 3/2005 | Rackett | |
| 6,972,786 B1 | 12/2005 | Ludwig | |
| 7,085,243 B2 | 8/2006 | Decker et al. | |
| 7,174,365 B1 | 2/2007 | Even et al. | |
| 7,362,349 B2 | 4/2008 | Nelson et al. | |
| 7,477,282 B2 | 1/2009 | Firestone et al. | |
| 7,499,075 B2 | 3/2009 | Miceli | |
| 7,558,221 B2 * | 7/2009 | Nelson et al. | 370/260 |
| 7,577,420 B2 | 8/2009 | Srinivasan et al. | |
| 7,599,682 B2 | 10/2009 | Takeda et al. | |
| 7,620,393 B2 | 11/2009 | Venkitaraman et al. | |
| 7,675,858 B2 | 3/2010 | Dekeyzer et al. | |
| 7,800,642 B2 | 9/2010 | Eshkoli et al. | |
| 7,830,824 B2 | 11/2010 | Decker et al. | |
| 7,844,260 B2 | 11/2010 | Nguyen et al. | |
| 8,060,225 B2 | 11/2011 | Hans et al. | |
| 8,150,920 B2 | 4/2012 | Forstadius | |
| 8,214,242 B2 | 7/2012 | Agapi et al. | |
| 8,259,155 B2 | 9/2012 | Marathe et al. | |
| 8,289,365 B2 | 10/2012 | De Lind Van Wijngaarden et al. | |
| 8,300,789 B2 | 10/2012 | Shah | |
| 8,316,104 B2 | 11/2012 | Galvez et al. | |
| 8,391,843 B2 | 3/2013 | Lee et al. | |
| 8,405,701 B2 | 3/2013 | De Lind Van Wijngaarden et al. | |
| 8,416,715 B2 | 4/2013 | Rosenfeld et al. | |
| 8,464,163 B2 | 6/2013 | Heikes et al. | |
| 8,482,593 B2 | 7/2013 | Periyannan et al. | |
| 8,483,098 B2 | 7/2013 | Vadlakonda et al. | |
| 8,484,705 B2 | 7/2013 | Hoppe et al. | |
| 8,503,654 B1 | 8/2013 | Ludwig | |
| 8,514,263 B2 | 8/2013 | Periyannan et al. | |
| 8,558,864 B1 | 10/2013 | Kooler et al. | |
| 8,595,296 B2 | 11/2013 | Berberian et al. | |
| 8,659,639 B2 | 2/2014 | Baldino et al. | |
| 8,692,862 B2 | 4/2014 | N'Guessan | |
| 9,002,974 B1 | 4/2015 | Dhanoa et al. | |
| 2002/0099634 A1 | 7/2002 | Coutts et al. | |
| 2002/0126201 A1 | 9/2002 | Schmitt et al. | |
| 2002/0159394 A1 | 10/2002 | Decker et al. | |
| 2002/0169592 A1 | 11/2002 | Aityan | |
| 2003/0009342 A1 | 1/2003 | Haley | |
| 2004/0030749 A1 | 2/2004 | Bowman-Amuah | |
| 2004/0236830 A1 | 11/2004 | Nelson et al. | |
| 2005/0034079 A1 | 2/2005 | Gunasekar et al. | |
| 2005/0195899 A1 | 9/2005 | Han | |
| 2006/0029129 A1 | 2/2006 | Hannuksela | |
| 2006/0032486 A1 | 2/2006 | Prasad | |
| 2006/0083244 A1 | 4/2006 | Jagadesan et al. | |
| 2006/0235927 A1 | 10/2006 | Bhakta et al. | |
| 2006/0294186 A1 | 12/2006 | Nguyen et al. | |
| 2007/0064901 A1 | 3/2007 | Baird et al. | |
| 2007/0111743 A1 | 5/2007 | Leigh et al. | |
| 2007/0127668 A1 | 6/2007 | Ahya et al. | |
| 2007/0156813 A1 | 7/2007 | Galvez et al. | |
| 2007/0165106 A1 | 7/2007 | Groves et al. | |
| 2007/0206089 A1 | 9/2007 | Eshkoli et al. | |
| 2007/0206673 A1 | 9/2007 | Cipolli et al. | |
| 2007/0242680 A1 | 10/2007 | Signaoff et al. | |
| 2007/0242694 A1 | 10/2007 | Signaoff et al. | |
| 2007/0263824 A1 | 11/2007 | Bangalore et al. | |
| 2007/0285503 A1 | 12/2007 | Asthana et al. | |
| 2007/0286388 A1 | 12/2007 | Vaught et al. | |
| 2008/0068449 A1 | 3/2008 | Wu et al. | |
| 2008/0075095 A1 | 3/2008 | Suryanarayana et al. | |
| 2008/0120675 A1 | 5/2008 | Morad et al. | |
| 2008/0165864 A1 | 7/2008 | Eleftheriadis et al. | |
| 2008/0209516 A1 | 8/2008 | Nassiri | |
| 2008/0313278 A1 | 12/2008 | Hochberg | |
| 2009/0003436 A1 | 1/2009 | Levin et al. | |
| 2009/0003439 A1 | 1/2009 | Wang et al. | |
| 2009/0015660 A1 | 1/2009 | Vedantham et al. | |
| 2009/0015661 A1 | 1/2009 | King et al. | |
| 2009/0016447 A1 | 1/2009 | Chen et al. | |
| 2009/0067507 A1 | 3/2009 | Baird et al. | |
| 2009/0157469 A1 | 6/2009 | D'Urso et al. | |
| 2009/0181665 A1 * | 7/2009 | Sater et al. | 455/424 |
| 2009/0204906 A1 | 8/2009 | Irving | |
| 2009/0210789 A1 | 8/2009 | Thakkar et al. | |
| 2010/0005497 A1 | 1/2010 | Maresca | |
| 2010/0008419 A1 | 1/2010 | Wu et al. | |
| 2010/0022225 A1 | 1/2010 | Benger et al. | |
| 2010/0085419 A1 | 4/2010 | Goyal et al. | |
| 2010/0283829 A1 | 11/2010 | De Beer et al. | |
| 2010/0315480 A1 | 12/2010 | Kahn | |
| 2011/0025816 A1 | 2/2011 | Brewer et al. | |
| 2011/0221860 A1 | 9/2011 | Rideout | |
| 2011/0246172 A1 | 10/2011 | Liberman et al. | |
| 2011/0279634 A1 | 11/2011 | Periyannan et al. | |
| 2011/0279635 A1 | 11/2011 | Periyannan et al. | |
| 2011/0279636 A1 | 11/2011 | Periyannan et al. | |
| 2011/0279637 A1 | 11/2011 | Periyannan et al. | |
| 2011/0279638 A1 | 11/2011 | Periyannan et al. | |
| 2011/0279639 A1 | 11/2011 | Anand et al. | |
| 2011/0283203 A1 | 11/2011 | Periyannan et al. | |
| 2012/0056971 A1 | 3/2012 | Kumar et al. | |
| 2012/0066596 A1 | 3/2012 | Feng et al. | |
| 2012/0066722 A1 | 3/2012 | Cheung et al. | |
| 2012/0082226 A1 | 4/2012 | Weber | |
| 2012/0242776 A1 | 9/2012 | Tucker et al. | |
| 2013/0061062 A9 | 3/2013 | Saito | |
| 2013/0342640 A1 | 12/2013 | Li et al. | |
| 2014/0092203 A1 | 4/2014 | Periyannan et al. | |
| 2014/0098180 A1 | 4/2014 | Periyannan et al. | |
| 2014/0313282 A1 | 10/2014 | Ma et al. | |

FOREIGN PATENT DOCUMENTS

| | | |
|---|---|---|
| EP | 1830568 A2 | 9/2007 |
| GB | 2349055 A | 10/2000 |
| WO | 94/24803 A1 | 10/1994 |

OTHER PUBLICATIONS

Response filed Aug. 21, 2015, from U.S. Appl. No. 13/955,646, filed Jul. 31, 2013, 5 pgs.

Response filed Sep. 22, 2015, from U.S. Appl. No. 14/217,133, filed Mar. 17, 2014, 5 pages.

Notice of Allowance dated May 26, 2015, from U.S. Appl. No. 13/105,723, filed May 11, 2011, 5 pgs.

Final Office Action dated Jun. 23, 2015, from U.S. Appl. No. 13/955,646, filed Jul. 31, 2013, 13 pgs.

Amendment filed Jul. 17, 2015, from U.S. Appl. No. 14/217,133, filed Mar. 17, 2014, 5 pages.

Final Office Action mailed Aug. 6, 2015, from U.S. Appl. No. 14/217,133, filed Mar. 17, 2014, 10 pages.

Notice of Allowance dated Jan. 16, 2015, from U.S. Appl. No. 13/105,684, filed May 11, 2010, 8 pgs.

Notice of Allowance dated Mar. 7, 2013, from U.S. Appl. No. 13/105,691, filed May 11, 2011, 13 pgs.

Final Office Action dated Apr. 29, 2015, from U.S. Appl. No. 13/919,576, filed Jun. 17, 2013, 10 pgs.

Amendment filed Mar. 24, 2015, from U.S. Appl. No. 13/919,576, filed Jun. 17, 2013, 8 pgs.

Office Action dated Dec. 26, 2014, from U.S. Appl. No. 13/919,576, filed Jun. 17, 2013, 9 pgs.

Notice of Allowance dated Apr. 29, 2015, from U.S. Appl. No. 13/251,913, filed Oct. 3, 2011, 8 pgs.

Amendment filed Mar. 23, 2015, from U.S. Appl. No. 13/251,913, filed Oct. 3, 2011, 9 pgs.

Office Action dated Dec. 22, 2014, from U.S. Appl. No. 13/251,913, filed Oct. 3, 2011, 17 pgs.

(56) References Cited

OTHER PUBLICATIONS

Amendment filed Jul. 16, 2014, from U.S. Appl. No. 13/251,913, filed Oct. 3, 2011, 10 pgs.
Final Office Action dated Apr. 17, 2014, from U.S. Appl. No. 13/251,913, filed Oct. 3, 2011, 11 pgs.
Amendment filed Mar. 26, 2014, from U.S. Appl. No. 13/251,913, filed Oct. 3, 2011, 15 pgs.
Office Action dated Sep. 26, 2013, from U.S. Appl. No. 13/251,913, filed Oct. 3, 2011, 14 pgs.
Notice of Allowance dated Apr. 18, 2013, from U.S. Appl. No. 13/105,699, filed May 11, 2011, 16 pgs.
Amendment filed Mar. 3, 2015, from U.S. Appl. No. 13/955,646, filed Jul. 31, 2013, 6 pgs.
Office Action dated Dec. 3, 2014, from U.S. Appl. No. 13/955,646, filed Jul. 31, 2013, 9 pgs.
Notice of Allowance dated Jan. 23, 2015, from U.S. Appl. No. 13/105,704, filed May 11, 2011, 7 pgs.
Response filed Jan. 16, 2015, from U.S. Appl. No. 13/105,704, filed May 11, 2011, 2 pgs.
Final Office Action dated Sep. 18, 2014, from U.S. Appl. No. 13/105,704, filed May 11, 2011, 8 pgs.
Amendment filed Sep. 10, 2014, from U.S. Appl. No. 13/105,704, filed May 11, 2011, 7 pgs.
Final Office Action dated Jun. 10, 2014, from U.S. Appl. No. 13/105,704, filed May 11, 2011, 10 pgs.
Amendment filed May 28, 2014, from U.S. Appl. No. 13/105,704, filed May 11, 2011, 4 pgs.
Office Action dated Feb. 27, 2014, from U.S. Appl. No. 13/105,704, filed May 11, 2011, 11 pgs.
Notice of Allowance dated Jun. 25, 2014, from U.S. Appl. No. 13/105,716, filed May 11, 2011, 5 pgs.
Amendment filed May 28, 2014, from U.S. Appl. No. 13/105,716, filed May 11, 2011, 7 pgs.
Office Action mailed Jan. 28, 2014, from U.S. Appl. No. 13/105,716, filed May 11, 2011, 11 pages.
Notice of Allowance dated Jul. 9, 2014, from U.S. Appl. No. 13/105,719, filed May 11, 2011, 9 pgs.
Amendment filed Jun. 25, 2014, from U.S. Appl. No. 13/105,719, filed May 11, 2011, 10 pgs.
Office Action dated Feb. 26, 2014, from U.S. Appl. No. 13/105,719, filed May 11, 2011, 13 pgs.
Office Action mailed May 7, 2015, from U.S. Appl. No. 14/217,133, filed Mar. 17, 2014, 06 pages.
Amendment filed May 11, 2015, from U.S. Appl. No. 13/105,723, filed May 11, 2011, 7 pgs.
Final Office Action dated Feb. 11, 2015, from U.S. Appl. No. 13/105,723, filed May 11, 2011, 12 pgs.
Amendment filed Jan. 13, 2015, from U.S. Appl. No. 13/105,723, filed May 11, 2011, 6 pgs.
Office Action dated Aug. 13, 2014, from U.S. Appl. No. 13/105,723, filed May 11, 2011, 10 pgs.
Amendment filed Jul. 25, 2014, from U.S. Appl. No. 13/105,723, filed May 11, 2011, 8 pgs.
Final Office Action dated Apirl 25, 2014, from U.S. Appl. No. 13/105,723, filed May 11, 2011, 10 pgs.
Amendment filed Feb. 27, 2014, from U.S. Appl. No. 13/105,723, filed May 11, 2011, 8 pgs.
Office Action dated Sep. 5, 2013, from U.S. Appl. No. 13/105,723, filed May 11, 2011, 8 pgs.
International Search Report, Patent Cooperation Treaty International Searching Authority (Aug. 19, 2011), PCT/US2011/036247, 4 Pgs.
International Search Report, Patent Cooperation Treaty International Searching Authority (Aug. 19, 2011), PCT/US2011/036257, 4 Pgs.
International Search Report, Patent Cooperation Treaty International Searching Authority (Aug. 19, 2011), PCT/US2011/036263, 4 Pgs.
International Search Report, Patent Cooperation Treaty International Searching Authority (Aug. 19, 2011), PCT/US2011/036266, 4 Pgs.
Written Opinion of the International Searching Authority, Patent Cooperation Treaty International Searching Authority (Aug. 19, 2011), PCT/US2011/036247, 4 Pgs.
Written Opinion of the International Searching Authority, Patent Cooperation Treaty International Searching Authority (Aug. 19, 2011), PCT/US2011/036257, 4 Pgs.
Written Opinion of the International Searching Authority, Patent Cooperation Treaty International Searching Authority (Aug. 19, 2011), PCT/US2011/036263, 4 Pgs.
Written Opinion of the International Searching Authority, Patent Cooperation Treaty International Searching Authority (Aug. 19, 2011), PCT/US2011/036266, 7 Pgs.
International Search Report, Patent Cooperation Treaty International Searching Authority (Jan. 13, 2012), PCT/US2011/054709, 3 Pgs.
Written Opinion of the International Searching Authority, Patent Cooperation Treaty International Searching Authority (Jan. 13, 2012), PCT/US2011/054709, 5 Pgs.
Amendment under Rule 161 filed Jun. 28, 2013, for EP Application No. 11721197.9 (filed May 12, 2011), 15 pgs.
Examination Report dated Aug. 6, 2014, from the European Patent Office for EP Application No. 11721197.9 (filed May 12, 2011), 5 pgs.
Response to Examination Report filed May 12, 2015, for EP Application No. 11721197.9 (filed May 12, 2011), 16 pgs.
Amendment under Rule 161 filed Jul. 18, 2013, for EP Application No. 11721199.5 (filed May 12, 2011), 15 pgs.
Examination Report dated Aug. 6, 2014, from the European Patent Office for EP Application No. 11721199.5 (filed May 12, 2011), 5 pgs.
Response to Examination Report filed May 7, 2015, for EP Application No. 11721199.5 (filed May 12, 2011), 14 pgs.
Amendment under Rule 161 filed Jul. 19, 2013, for EP Application No. 11722956.7 (filed May 12, 2011), 16 pgs.
Examination Report dated Aug. 6, 2014, from the European Patent Office for EP Application No. 11722956.7 (filed May 12, 2011), 5 pgs.
Response to Examination Report filed Apr. 14, 2015, for EP Application No. 11722956.7 (filed May 12, 2011), 15 pgs.
Amendment under Rule 161 filed Jul. 22, 2013, for EP Application No. 11722955.9 (filed May 12, 2011), 16 pgs.
Examination Report dated Aug. 6, 2014, from the European Patent Office for EP Application No. 11722955.9 (filed May 12, 2011), 4 pgs.
Amendment under Rule 161 filed Nov. 25, 2013, for EP Application No. 11768260.9 (filed May 12, 2011), 11 pgs.
Response to Examination Report filed May 21, 2015, for EP Application No. 11722955.9 (filed May 12, 2011), 16 pgs.
Amendment filed Jul. 9, 2014, from U.S. Appl. No. 13/105,684, filed May 11, 2010, 9 pgs.
Amendment filed Dec. 22, 2014, from U.S. Appl. No. 13/105,684, filed May 11, 2010, 12 pgs.
Amendment filed Mar. 25, 2014, from U.S. Appl. No. 13/105,684, filed May 11, 2010, 13 pgs.
Final Office Action dated Apr. 9, 2014, from U.S. Appl. No. 13/105,684, filed May 11, 2010, 16 pgs.
Office Action dated Jul. 22, 2014, from U.S. Appl. No. 13/105,684, filed May 11, 2010, 15 pgs.
Office Action dated Nov. 25, 2013, from U.S. Appl. No. 13/105,684, filed May 11, 2010, 16 pgs.

* cited by examiner

METHODS AND SYSTEMS FOR INTERFACING HETEROGENEOUS ENDPOINTS AND WEB-BASED MEDIA SOURCES IN A VIDEO CONFERENCE

CROSS REFERENCE TO RELATED APPLICATIONS

This application is a NON-PROVISIONAL of, claims priority to, and incorporates by reference in its entirety U.S. Provisional Application Nos. 61/798,371 and 61/798,497, both filed on Mar. 15, 2013, and U.S. Provisional Application Nos. 61/803,320 and 61/803,324, both filed on Mar. 19, 2013. This application is also a CONTINUATION-IN-PART of U.S. patent application Ser. No. 13/105,684, filed on May 11, 2011, entitled "Systems and Methods for Real-Time Multimedia Communication Across Multiple Standards and Proprietary Devices", which is also incorporated herein by reference in its entirety.

FIELD OF THE INVENTION

The present invention relates to methods, network devices and machine-readable media for interfacing heterogeneous user endpoints of a video conference, and also relates to methods, network devices and machine-readable media for incorporating web-based media sources into the video conference.

BACKGROUND

Video conferencing between homogeneous user-endpoints (e.g., all Skype clients or all FaceTime clients) is widely used. However, video conferencing systems still do not easily permit heterogeneous user-endpoints to communicate with one another (e.g., a Skype client to communicate with a FaceTime client). Such technological challenge and other challenges are addressed herein.

SUMMARY

In one approach to interfacing heterogeneous endpoints of a video conference with one another, a client application from a media provider (e.g., Skype) may be installed at a virtual machine, and may be used to decode an A/V stream (from one of the endpoints) which is encoded in a format proprietary to the media provider. The decoded A/V stream can then be composed with A/V streams from other endpoints in order to form a composite A/V stream. The composite A/V stream may then be encoded into a format compatible with one of the endpoints.

In one embodiment of the invention, only one client application is installed at each virtual machine, since a client application's processing of A/V streams can be computationally intensive. A result of such an implementation is that the number of virtual machines needed at any particular time may fluctuate over time in response to the number of endpoints (particularly those endpoints which encode A/V streams in a proprietary manner). To accommodate such fluctuation in computational resources, a form of load prediction is employed (as described below).

In one approach to interfacing a web-based media source (e.g., YouTube) with a video conference, a browser may be installed at a virtual machine, and may be used to virtually render a media signal from the web-based media source. Such virtually rendered media signal is subsequently captured and may then be composed with A/V streams from endpoints in order to form a composite A/V stream. The composite A/V stream may then be encoded into a format compatible with one of the endpoints.

In one embodiment of the invention, only one browser is installed at each virtual machine, since a browser's processing of A/V streams can be computationally intensive. A result of such an implementation is that the number of virtual machines needed at any particular time may fluctuate over time in response to the number of web-based media sources interfaced with a video conference. To accommodate such fluctuation in computational resources, load prediction once again may be employed. In another embodiment of the invention, multiple browsers are launched as separate processes within a single server or single virtual machine in case of less computationally intensive processing tasks. In such a case, the fluctuations in the number of video conferences may be handled by launching more or less processes within the single server or single virtual machine.

These and further embodiments of the present invention are discussed herein.

BRIEF DESCRIPTION OF THE DRAWINGS

The present invention is illustrated by way of example, and not limitation, in the figures of the accompanying drawings in which.

DETAILED DESCRIPTION

Figure 1:
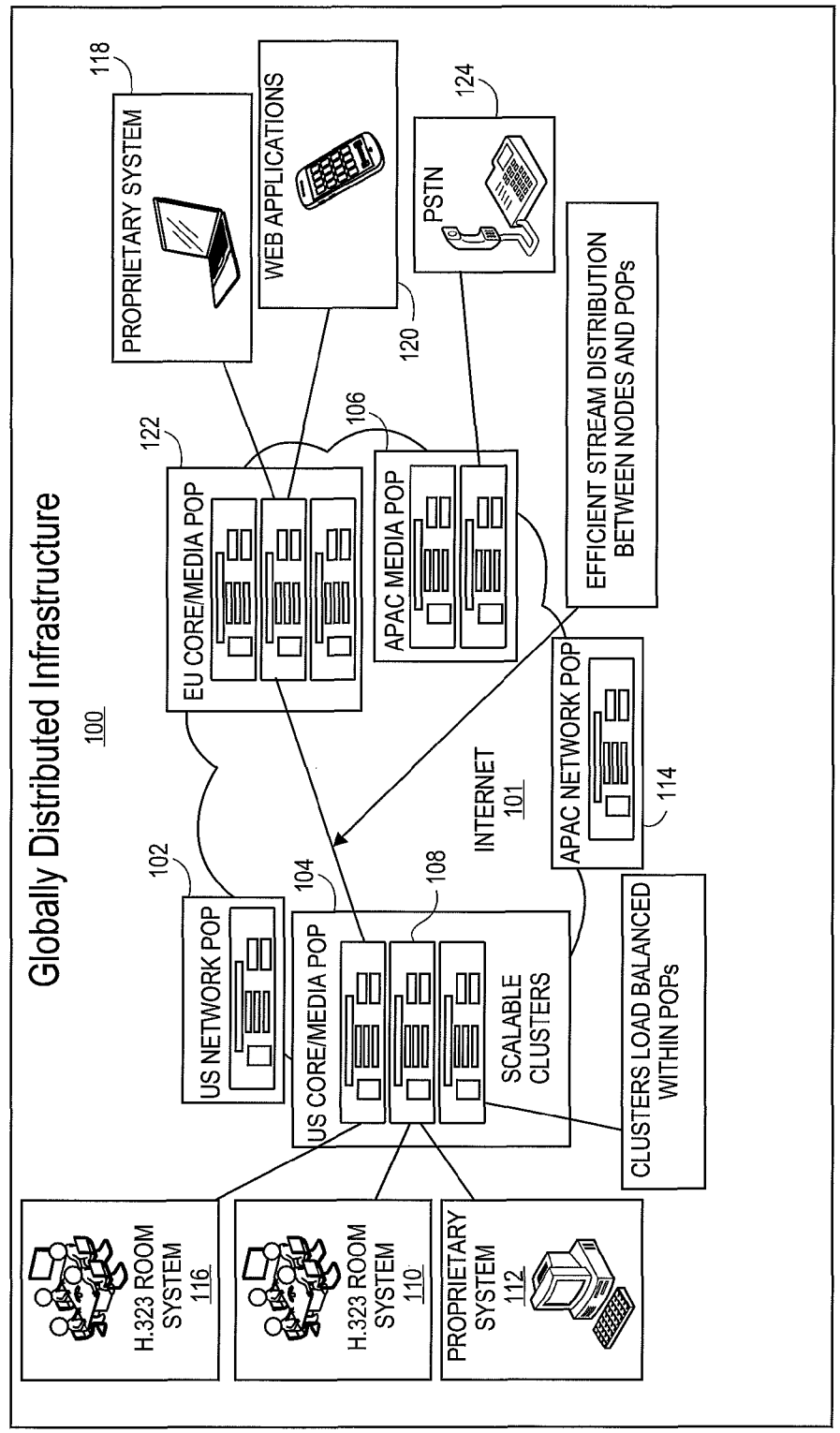
FIG. 1 depicts an exemplary video conference system, in accordance with some embodiments of the invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The video conference system configured in accordance with some embodiments of the present invention may provide a user interface for presentation of the received data streams for a video conference. In some embodiments, the video conference system may support the operation of a video conference, such as a conference with a virtual media room or virtual meeting room (VMR) user interface, wherein each VMR user interface may present data from a plurality of endpoints (e.g., devices of participants in the video conference) at one or more geographic locations. Examples of approaches to video conference systems that may be practiced in some embodiments are provided in U.S. patent application Ser. No. 13/105,691, entitled "Systems and Methods for Scalable Composition of Media Streams for Real-Time Multimedia Communication," filed on May 11, 2011 (issued as U.S. Pat. No. 8,482,593 on Jul. 9, 2013), U.S. patent application Ser. No. 13/105,684, entitled "Systems and Methods for Real-time Multimedia Communications Across Multiple Standards and Proprietary Devices," filed on May 11, 2011, U.S. patent application Ser. No. 13/919,576, entitled "Systems and Methods for Scalable Composition of Media Streams for Real-time Multimedia Communication," filed on Jun. 17, 2013, U.S. patent application Ser. No. 13/105,699, entitled "Systems and Methods for Scalable Distributed Global Infrastructure for Real-time Multimedia Communication," filed on May 11, 2011 (issued as U.S. Pat. No. 8,514,263 on Aug. 20, 2013), U.S. patent application Ser. No. 13/955,646, entitled "Systems and Methods for Scalable Distributed Global Infrastructure for Real-time Multimedia Communication," filed on Jul. 31, 2013, U.S. patent application Ser. No. 13/105,704, entitled "Systems and Methods for Security and Privacy Controls for Videoconferencing," filed on May 11, 2011, U.S. patent application Ser. No. 13/105,716, entitled "Systems and Methods for Shared Multimedia Experiences in Virtual Videoconference Rooms," filed on May 11, 2011, U.S. patent application Ser. No. 13/105,719, entitled "Systems and Methods for Novel Interactions with Participants in Videoconference Meetings," filed on May 11, 2011, U.S. patent application Ser. No. 13/105,723, entitled "Systems and Methods for Real-time Virtual-reality Immersive Multimedia Communications," filed on May 11, 2011, and U.S. patent application Ser. No. 13/251,913, entitled "Systems and Methods for Error Resilient Scheme for Low Latency H.264 Video Coding," filed on Oct. 3, 2011, each incorporated herein by reference in its respective entirety.

The video conference system is described in more detail with reference to FIGS. 1 and 2, and, as illustrated, may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

As a non-limiting example, video data streams from proprietary video conference endpoints using proprietary communication protocols implemented for client applications include, but are not limited to, the following: Microsoft Skype application, Polycom video conference applications, Microsoft Lync applications, Google Talk applications, web applications capable of real time communication, and/or any other application providing communication services. Video data streams from standards-based video conference endpoints, include, but are not limited to, H.323 and Session Initiation Protocol (SIP). Additionally, the video conference system may support data streams from a media gateway that converts digital media streams between disparate telecommunication networks, such as from devices using public switched telephone networks (PSTN), SS7, and Next Generation Networks. Each video conference can be implemented and supported across an infrastructure of a globally distributed set of commodity servers acting as media processing nodes co-located in Points of Presence (POPs) for Internet access, wherein such a distributed architecture can support thousands of simultaneously active video conferences in a reservation-less manner and that is transparent to the user participants. Each video conference provides users with a rich set of conferencing and collaboration interaction.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

A globally distributed infrastructure for the video conference system supports the sharing of the event (e.g., the session) among the participants at geographically distributed locations with the use of a plurality of MCUs (Multipoint Control Units), each configured to process the plurality of audio and/or video streams from the plurality of video conference endpoints in real time. Those with skill in the art will recognize that a globally distributed infrastructure is not required to practice the invention. A geographically distributed architecture and/or simply a distributed architecture may be implemented to practice the invention.

Compared to conventional video conference system approaches that require every participant to the video conference to follow the same communication standard or protocol and/or use the same client application from a communication service provider, a video conference supported by the globally distributed infrastructure with at least one MCU at a media server allows the participants of a video conference to participate in a multi-party or point-to-point video conference session in device, address scheme, protocol, and/or communication service provider independent fashion. By conducting manipulation of the video and audio streams transparently in on a remote server (e.g., a server of a POP that is accessible via one or more networks or networks of networks) without end user involvement, the proposed approach brings together video conference systems and applications of different devices, different protocols of video conferencing, and/or different communication services from communication service providers as one integrated system. Communication service providers may include, but are not limited to, the following: providers of Voice over Internet Protocol (VoIP), instant messaging services supporting voice and/or data, and/or service provider with applications that allow for transport of information electronically.

In particular, the video conference system provides the integration of services from different communication service providers (e.g., Skype, and Google Talk) that support different addressing schemes for identifying users on devices. For example, a participant user may login to a Skype client to join a video conference using a communication service identifier (e.g., username, Skype id) and communicate with a participant user who logins to a Google Talk client using an email address. Ordinarily, a communication service provider may require a user to identify each participant on the communication session with an identifier registered with the communication service (e.g., communication service identifier, email address, username, etc.), so that the communication service provider may look up the address of the user endpoint to communicate, and the communication service provider may not support integration with other communication services. The video conference system integrates with the communication service provider services/system seamlessly for the user, so that the user can login with any client application with an identifier registered with the communication service provider and participate in the video conference.

In some embodiments, the endpoint for a participant using a client application is communicating with a corresponding client application for the communication service provider executing as a virtual client application on a server in the backend. A virtual client application is a client application that may be executed on a server of the video conference system to receive data streams from the client application executing on a participant endpoint device, and the output or presentation of the data streams within the virtual client application may be captured and combined with other data streams to form a composite for the video conference. Examples of approaches to video conference systems that support different communication services are provided in U.S. patent application Ser. No. 13/105,684, entitled "Systems and Methods for Real-Time Multimedia Communication across multiple standards and proprietary devices" filed on May 11, 2011, incorporated herein by reference in its entirety.

Hosting the video conference on at least one media server accessible on a network (e.g., Internet/cloud) allows for the participants to initiate a video conference with any device, supporting any communication protocol, and any client application from a communication service provider, have the system communicate with the other participants at each of their selected endpoint devices, and the other participants may accept the request to join the video conference from any endpoint device using any client application from any communication service provider that he/she wishes. A video conference hosted on a server accessible over the Internet/cloud enables any participant to be able to upload media content to a server (i.e., a node) of the global distributed infrastructure accessible over the Internet (e.g., in the cloud) and have it be retransmitted to other participants in formats of their choice transparently, with or without modifications.

Distributed Infrastructure

FIG. 1 depicts an exemplary system, in accordance with some embodiments of the invention. As shown in FIG. 1, to support the operations of video conferencing, one or more media processing nodes (known in the industry as an MCU) (e.g., nodes of 102, 104, 106, 114, and 122) are used to process and compose video conference feeds from various endpoints, and in particular, the media processing nodes of the globally distributed infrastructure 100 are able to offer a multi-protocol bridging solution to deliver content to disparate endpoints. In the example of FIG. 1, a globally distributed infrastructure 100 enables efficient and scalable processing and compositing of media streams by building the MCUs as the media processing nodes (e.g., 102, 104, 106, 114, and 122) for video stream processing from off-the-shelf components, such as Linux/x86 Central Processing Units (CPUs) and PC Graphics Processing Units (GPUs) instead of custom hardware. These MCUs can be deployed in a rack-and-stack cloud-computing style and hence achieves the most scalable and cost/performance efficient approach to support the video conferencing service. The x86 architecture has improved vastly over the years in its Digital Signal Processing (DSP) capabilities and is able to now support the processing for the video conference system. Additionally, off-the-shelf GPU used for rendering PC graphics can be used to augment the processing power of the CPU and/or any other processor.

In the example of FIG. 1, the globally distributed infrastructure 100 that supports and enables the operations of the video conference has at least one or more of the following attributes:

(1) Ability to support wide variety of audio video formats and protocols;

(2) Scalable mixing and composition of the audio and video streams;

(3) Service delivered across the globe with minimized latency; and (4) Capital efficient to build and cost efficient to operate.

In some embodiments, globally distributed infrastructure 100 may be implemented with clusters of x86 servers both locally on a LAN as well as across geographies serving as the media processing nodes for the MCUs to achieve near unlimited scaling. All of the media processing nodes of the clusters (e.g., 102, 104, 108, 106, and 114) may work together forming one giant MCU. In some embodiments, such clustered design makes use of network layer multicast and a novel multi-bit-rate stream distribution scheme to achieve the unlimited scaling. The globally distributed infrastructure 100 is able to achieve great scalability in terms of the number of participants per call, geographic distribution of callers, as well as distribution of calls across multiple POPs worldwide.

By way of a non-limiting example, globally distributed infrastructure 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers. Those with skill in the art will recognize that an implementation of the globally distributed infrastructure 100 for the video conference system with the same number and/or geographic locations for Core Media and/or Network POPs of FIG. 1 is not required and any number of Core Media POPs and Network POPs may be used to provide a content delivery network 103 for a video conference system. In some embodiments, each Core/Media POP may have the processing power (e.g., servers) to handle the load for that geographical region where the POP is located. Users/participants connecting to the video conference system may be directed to the closest Core Media POP (e.g., the "connector" at a POP, described in more detail with FIG. 2) that can handle the processing for the conference so as to allow them to minimize their latency.

Once the participants are in communication with a POP of the globally distributed infrastructure 100, their conference feeds of audio and video streams can be carried on a high performance network POPs (e.g., US Network POP 102, APAC Network POP 114) between the POPs. Additionally, in some embodiments, Network POPs (e.g., US Network POP 102, APAC Network POP 114) can be used for communication (e.g., traffic) with users in places where a Core Media POP does not exist. By way of example, an endpoint can communicate with a Network POP in a more optimal location for communication than the nearest Core Media POP, and the Network POP may send/forward the traffic to a Core Media POP over a private dedicated network so as to avoid use of the open Internet. The globally distributed infrastructure 100 enables media processing nodes to act as one single system.

FIG. 1 depicts an example of a system for media stream distribution processing that may be achieved locally on a Local Area Network (LAN) present in each POP and/or across multiple POPs on the Wide Area Network (WAN). For example, media stream distribution may be handled with a single node media distribution using a single POP (as shown with the use of server 108), where video conference feeds from participants to a video conference via for non-limiting examples, room systems running H.323 (as shown with 110), PCs running H.323, PCs running Skype (as shown with 112), all connect to one node in a POP (as shown with 108) based on proximity to the conference host, where the video conference feeds are load balanced but not clustered among nodes in the POP. In another example, media stream distribution may be handled with clustered nodes media with a POP (as shown with 104), wherein video conference feeds from the participants (e.g., 110, 112, and 116) are load balanced among cluster of nodes at the POP, and the audio/video streams are distributed/overflowed among the nodes in the POP. In another example, media stream distribution processing may be handled with complete media distribution among both the cluster of nodes within the POP (e.g., 104) and among different POPs (e.g., 102, 106, 114, and 122) as well, where some participants to the conference may connect to their closest POPs (e.g., 118 and 120 connect to 122, and 124 connects to 106) instead of a single POP.

In some embodiments, the globally distributed infrastructure 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
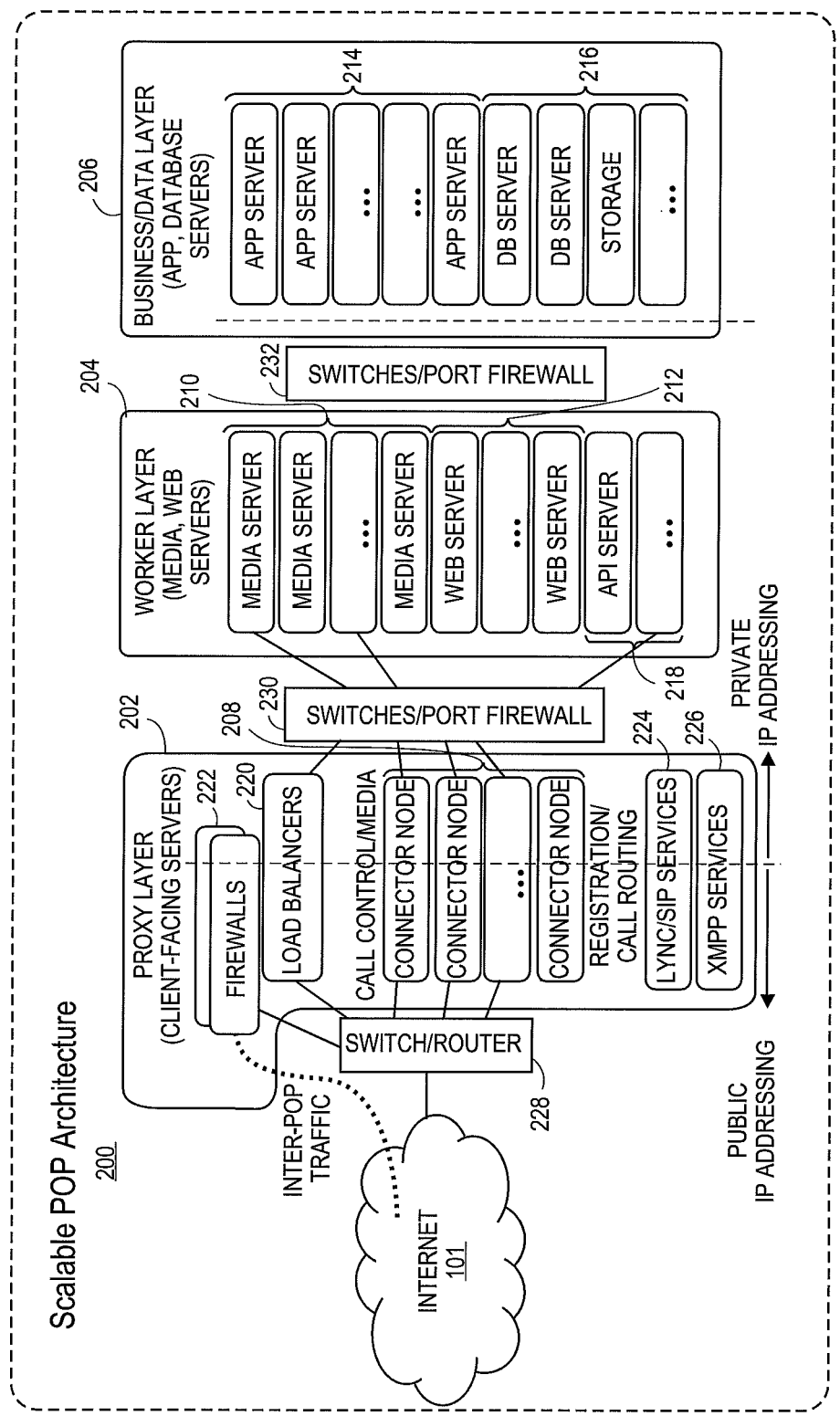
FIG. 2 depicts a scalable Point of Presence (POP) architecture, in accordance with some embodiments of the invention.

FIG. 2 depicts an exemplary system in accordance with some embodiments of the invention. FIG. 2 depicts a Scalable POP Media Processing Node Architecture 200 (e.g., architecture for POPs 102, 104, 106, 114, and 122) accessible over a network 101 with a Proxy Layer 202, a Worker Layer 204, and a Business/Data Layer 206. Some of the components/elements of the Scalable POP Architecture 200, include but are not limited to, the following: load balancers 220, firewalls 222, media servers collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the globally distributed infrastructure 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media servers 210 of the Worker Layer 204, such operation of the media servers 210 used to form composite data streams for the endpoints. Translating (when needed) may include receiving the data packets of a data stream communicated using a first communication protocol and retransmitting the received data packets using a second communication protocol. While the communication protocol in which the data stream is communicated is changed, the actual data packets may remain unchanged. In contrast, transcoding (when needed) may include decoding data (e.g., data packets) in a received first communication protocol to an intermediate format and encoding the data into a common target format for a common, target communication protocol. Other implementations may provide for transcoding to be performed at the proxy layer 202 with a protocol connector node 208.

In some embodiments, global infrastructure 100 provides a high-level mechanism for fault tolerant protocol handling to prevent improper input from causing instability and possible security breach via protocol connector 208 or media servers 210. Media processing tasks by protocol connectors 208 and/or media servers 210, such as processing of protocol control messages and compressing audio and video streams may be isolated in one or more separate, independent, unprivileged processes. More specifically, (1) Separate processes: each incoming connection may cause a new process to be created by protocol connector node 208 or media server 210 to handle it. This process may be responsible for decompressing the incoming media stream, translating the incoming control messages into internal API calls, and decompressing the media into an internal uncompressed representation. For a non-limiting example, inbound H.264 video can be converted into YUV420P frames before being passed on to another process. In this way, if this process crashes, no other part of the system may be affected except the conference endpoint handled by that process.

(2) Independent processes: each connection may be handled in its own process. A given process in a protocol connector node 208 or media server 210 may be responsible for one videoconference endpoint, so that if this process crashes, only that single endpoint will be affected and everyone else in the system will not notice anything.

(3) Unprivileged processes: each process should be as isolated as possible from the rest of the system. In some embodiments, to accomplish this, ideally each process runs with its own user credentials, and may use the chroot( ) system call to make most of the file system inaccessible.

(4) Performance considerations: protocol connector 208 or media server 210 may introduce several processes where typically only one exists and brings about the possibility of performance degradation, especially in a system handling audio and video streams where a large amount of data needs to be moved between processes. To that end, shared memory facilities can be utilized to reduce the amount of data that needs to be copied.

In some embodiments, media-processing servers 210 are designed to convert and compose several videoconference feeds of video and audio streams in real-time to create and render one or more composite multimedia streams for each participant to the video conference (e.g., VMR). Media-processing servers 210 may include as its components one or more of: video compositor, video transcoder, distributed multicast video switch, audio transcoder/pre-processor, distributed multicast audio mixer, and each component may be in communication with protocol connector 208 and a distributed conference session controller. In the case of video, the video streams from the participants are made available at the media processing server 210 in three (or more) forms: original compressed video, uncompressed raw video, and a lower resolution compressed thumbnail video.

By way of example, a video compositor of a module executing on a media processing node 210 subscribes to whichever video stream it needs based on the set of videos needed to compose and be rendered to the participants. The two (or more) compressed forms of the video streams listed above may be transcoded by video transcoder sent by distributed multicast video switch using a multicast address on the network so that other (remote) media processing nodes that want these video streams can subscribe to them as needed. This scheme allows the entire cluster of nodes (locally and globally) to share and/or exchange the audio and video streams they need in the most efficient manner. These streams could be transmitted over the public Internet, over a private network or over a provisioned overlay network with service level guarantees. Using this approach, video compositor may show various composites, including but not limited to, just the active speaker, two people side-by-side if they are having a conversation, and any other custom format as requested by a participant, which may include transformations of the video into other representations as well. Continuing with the example, a video transcoder of media processing server 210 encodes and decodes composite video streams efficiently, where characteristics of each individual stream can be extracted during decoding.

In some embodiments, video compositor not only composes the raw video stream into a composite video stream but also builds up a composite metadata field in order to apply similar operations (including both 2D and 3D operations) outlined in the metadata field to the individual video streams of the composite video. As a non-limiting example, motion vectors need to be applied with the same transformation that video compositor may apply to each raw video stream, including but not limited to, scaling, rotation, translation, shearing. This metadata could be used for other non-real-time multimedia services including but not limited to recorded streams and annotated streams for offline search and indexing.

In some embodiments, application server 214 (e.g., a user experience engine) renders multimedia content including but not limited to the composite audio/video stream to each of the participants to the video conference for an enhanced User Experience (UE) for the participants. The UE provided by the application server 214 to the participants may comprise one or more of the following areas:

(1) Physical interaction with the video conference endpoint. The application server 214 provides a web application that enables controlling the setup and management of a multi-party video conferencing session in a device/manufacturer independent way. Most of the physical interaction with the manufacturer supplied remote control can be subsumed by a web application, wherein the web application can be launched from any computing or communication device, including laptop, smart phones or tablet devices. In some embodiments, these interactions could be driven through speech or visual commands as well that the Internet/cloud based software recognizes and translates into actionable events.

(2) User interface (UI) associated with a web application allows the participants to interact with the video conference system for video conference session. Here, application server 214 controls the interaction of the moderator and the conferencing participants. Through an intuitive UI provided by application server, participants to the video conference can control such features such as video layouts, muting participants, sending chat messages, screen sharing and adding third-party video content.

(3) Video/Multimedia content. Application server 214 controls content rendered in the form of screen layouts, composite feeds, welcome banners, etc. during the video conference as well as what the participants see when they log into a video conference, what they physically see on the screen etc. In some embodiments, the UI and/or the multimedia content could contain information related to performance metrics for the participant's call experience, including but not limited to video resolution, video and audio bitrate, connection quality, packet loss rates for the connection, carbon offsets gained as a result of the call, transportation dollars saved and dollars saved in comparison to traditional MCU-based calls.

(4) Customization of the video conference session for a specific (e.g., vertical industry) application. Application server 214 allows customization of the user interface in order to tailor a video conference session to the needs of a particular industry so that the conference participants may experience a new level of collaboration and meeting effectiveness. Such vertical industries or specialties include but are not limited to, hiring and recruiting, distance learning, telemedicine, secure legal depositions, shared-viewing of real-time events such as sports and concerts and customer support.

(5) Personalization of the video conference as per the moderator's and/or the participants' preferences and privileges. Application server 214 provides the moderator the ability to personalize the meeting when scheduling a video conference. Examples of such customization include but are not limited to, the initial welcome banner, uploading of meeting agenda, specifying the video layouts that will be used in the session and privileges given to the session participants.

Despite the fact that most conventional video conference systems cost tens of thousands of dollars, they offer very limited freedom and flexibility to the call organizer or to any participants in terms of controlling the user experience during the call. The layouts come pre-configured to a select few options, and the settings that can be modified during a call are also limited.

In some embodiments, application server 214 provides moderator-initiated in-meeting/session management and control over security and privacy settings during a particular video conference call, wherein such management and control features include but are not limited to, muting a particular speaker at the video conference, controlling and/or broadcasting layouts associated with one of the video conference endpoints to all or a subset of the participants, and sharing additional materials selectively with a subset of the participants (for a non-limiting example, in an HR vertical application where multiple interviewers are interviewing one candidate in a common call).

By offering the video conferencing service over the Internet/cloud, application server 214 eliminates a lot of these limitations of the conventional video conference systems. For a non-limiting example, application server 214 enables participant's associated different types of video conference endpoints to talk to each other over the Internet during the video conference. For a non-limiting example, participants from H.323 endpoints can to talk to participants from desktop clients such as Skype, and both the moderator and the participants can choose from a wide variety of options. In addition, by providing the ability to terminate the service in the cloud, application server 214 enables access to a much richer set of features for a conference call that a participant can use compared to a conventional passively bridged conference call. More specifically, every participant can have control of one or more of:

(1) Which active participants to the session to view in his/her video windows on the screen of his/her video conference endpoint.

(2) Layout options for how the different participants should be shown on the screen of his/her video conference endpoint.

(3) Layout options on where and how to view the secondary video channel (screen sharing, presentation sharing, shared viewing of other content) on the screen of his/her video conference endpoint.

Using such in-meeting controls, a moderator can control security and privacy settings for the particular call in ways. The moderator of the call, in addition to the aforementioned options, has a richer suite of options to pick from through a web interface to manage and control the video conference, which include but are not limited to, (1) Muting subsets of participants during a call.
(2) Sharing content with subsets of participants during the course of a call.

(3) Prescribing a standard layout of the screen of his/her video conference point and a set of displayed callers for other participants to see.
(4) Choosing to display caller-specific metadata on the respective video windows of a subset of the participants, including user-name, site name, and any other metadata.
(5) Easy and seamless way to add or remove participants from the video conference call through a real-time, dynamic web interface.
(6) Easily customizable welcome screen displayed to video callers on joining the call that can display information relevant to the call as well as any audio or video materials that the service provider or the call moderators wishes for the participants to see.

In some embodiments, application server 214 enables private conferences by creating sub-rooms in main VMR that any subset of the participants to the main VMR could join and have private chats. For a non-limiting example, participants can invite others for a quick audio/video or text conversation while being on hold in the main VMR.

A shared experience of events among participants to a video conference often requires all participants to be physically present at the same place. Otherwise, when it happens over the Internet, the quality is often very poor and the steps needed to achieve this are quite challenging for the average person to pursue this as a viable technological option.

In some embodiments, application server 214 provides collaborative viewing of events through VMRs that can be booked and shared among the participants so that they are able to experience the joy of simultaneously participating in an event and sharing the experience together via a video conference. For a non-limiting example, the shared event can be a Super Bowl game that people want to enjoy with friends, or a quick session to watch a few movie trailers together among a group of friends to decide which one to go watch in the theater.

In some embodiments, application server 214 utilizes the MCUs of the global infrastructure 100 to offer an easy, quick, and high-quality solution for event sharing. More specifically, application server 214 enables one initiating participant to invite a group of other participants for a shared video conference call via a web application. Once everyone joins in the VMR to share online videos and content, an initiating participant may provide a uniform resource locator (URL) where the content is located and the content may be streamed into a VMR directly from the content source whether the content is local to the initiating participant device or located remotely and accessed over the Internet from a third party web site or content store. Participants may continue to have conversations with other participants while watching this content. Other features provided include but are not limited to, altering the layout of the content in terms of where it is visible, its audio level, whether it should be muted or not, whether it should be paused or removed temporarily are in the control of the person sharing the content similar to the management and control by a moderator to a video conference as discussed above. Such an approach provides a compelling and novel way to watch live events among groups of people whose locations are geographically distributed, yet want to experience an event together. This enables a whole new set of applications around active remote participation in live professional events such as conferences and social events such as weddings.

In some embodiments, application server 214 enables multiple views and device-independent control by the participants to the video conference. Here, the video endpoints each have its own user interface and in the case of hardware video systems available in conference rooms, the video conference endpoints may each have a remote control that is not very easy to use. In order to make the user experience of connecting to the VMR simple, user experience engine 106 minimizes the operations that one need to carry out using the endpoints' native interface and moves all of those functions to a set of interfaces running on a device familiar to most users—desktop PC, laptop PC, mobile phone or mobile tablet, and thus makes the user experience to control the VMR mostly independent of the endpoint devices' user interface capabilities. With such device-independent control of the video conference, application server provides flexibility, ease-of-use, richness of experience and feature-expansion that it allows to make the experience far more personal and meaningful to participants.

In some embodiments, application server 214 may also allow a participant to participate in and/or control a video conference using multiple devices/video conference endpoints simultaneously. On one device such as the video conference room system, the participant can receive audio and video streams. On another device such as a laptop or tablet, the same participant can send/receive presentation materials, chat messages, etc. and also use it to control the conference such as muting one or more of the participants, changing the layout on the screens of the video conference endpoints with PIP for the presentation, etc. The actions on the laptop are reflected on the video conference room system since both are connected to the same VMR hosting the video conference.

Joining a video conference from H.323 endpoints today often involve cumbersome steps, which must be performed via a remote-control for the endpoint device. In addition to logistical issues such as locating the remote in a room, there are learning-curve related issues, such as finding the correct number to call from the directory, entering a specified code for the call from the remote, etc. In some embodiments, an endpoint can be setup to always just dial one number when it is turned on or woken up from sleep. Once the call is established, then a different user interface, such as a web application or mobile device client application, can be used to select which meeting to join.

In some embodiments, application server 214 provides a user experience with a user interface rendering to the participants welcome screen content that includes, but is not limited to, the following: an interactive welcome handshake, a splash screen, interactions for entering room number related info, and a welcome video, etc. for video conferences. To join a call from a video conference endpoint, all that the moderator needs to do is to call a personal VMR number he/she subscribes to. The moderator can then setup details for the call, including the rich media content that would form part of the welcome handshake with other participants, which may then be setup as default options for all calls hosted by the moderator. Other participants call into the VMR and enter the room number specified for the conference call. On joining the VMR, they first enjoy the rich media content setup as their welcome screen, including content specific to the call, such as an agenda, names of the parties calling in, company related statistics etc. Such content could also be more generic for non-business applications, including any flash content including videos, music, animations, advertisements, etc. Upon joining the call, the display also may show a code that is specific to the participant on his/her screen, which can be applied to the content on the call for content sharing. The code can also be entered from a web application used for the call or can be provided through voice or visual commands that are recognized and processed by software in the internet cloud that are then translated into actionable events.

Figure 3:
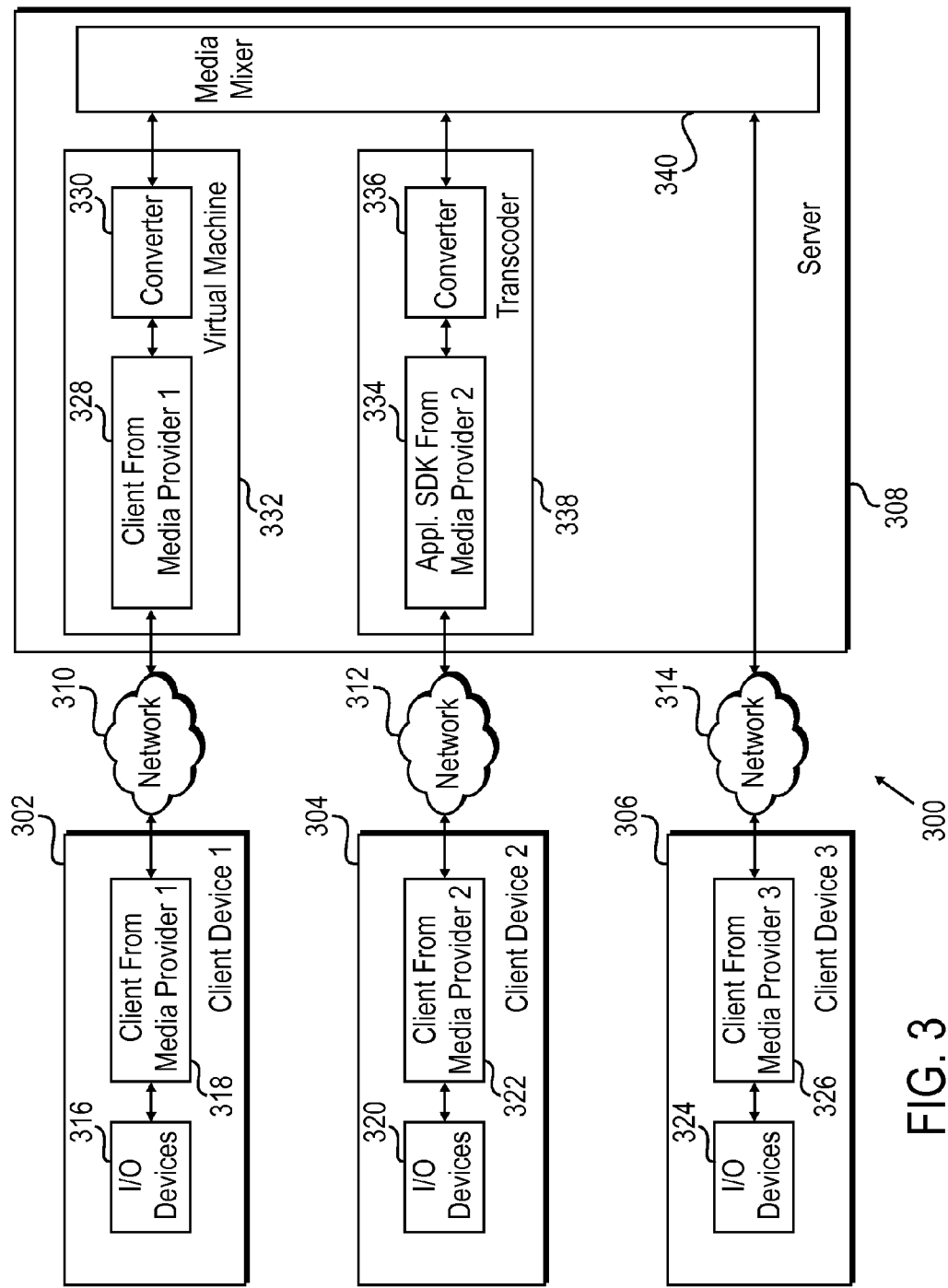
FIG. 3 depicts an exemplary video conference system, in accordance with some embodiments of the invention.

FIG. 3 depicts system 300, in accordance with some embodiments of the invention. As depicted in system 300, client devices 302, 304 and 306 may be communicatively coupled to server 308 via networks 310, 312 and 314, respectively. While three client devices have been depicted for ease of illustration, any number of client devices may be present in system 300. Likewise, while a single server (i.e., server 308) has been depicted, one or more servers may be present in system 300. Networks 310, 312 and 314 may be part of a wired and/or wireless network, part of a private or public network, part of a LAN, WAN and MAN, and/or part of the Internet. While three separate networks have been depicted for ease of illustration, such networks may be part of a single network.

Each of the client devices 302, 304 and 306 may be a smartphone, tablet computing device, desktop computer and/or a video conference device. Client device 302 may comprise input/output (I/O) devices 316 communicatively coupled to client application 318. Client application 318 may be a Skype client application (from Microsoft Corp. of Redmond, Wash.), a WebEx client application (from Cisco Systems, Inc. of San Jose, Calif.), a FaceTime client application (from Apple Inc. of Cupertino, Calif.) or a Blue Jeans application (from Blue Jeans Network of Mountain View, Calif.).

Figure 4:
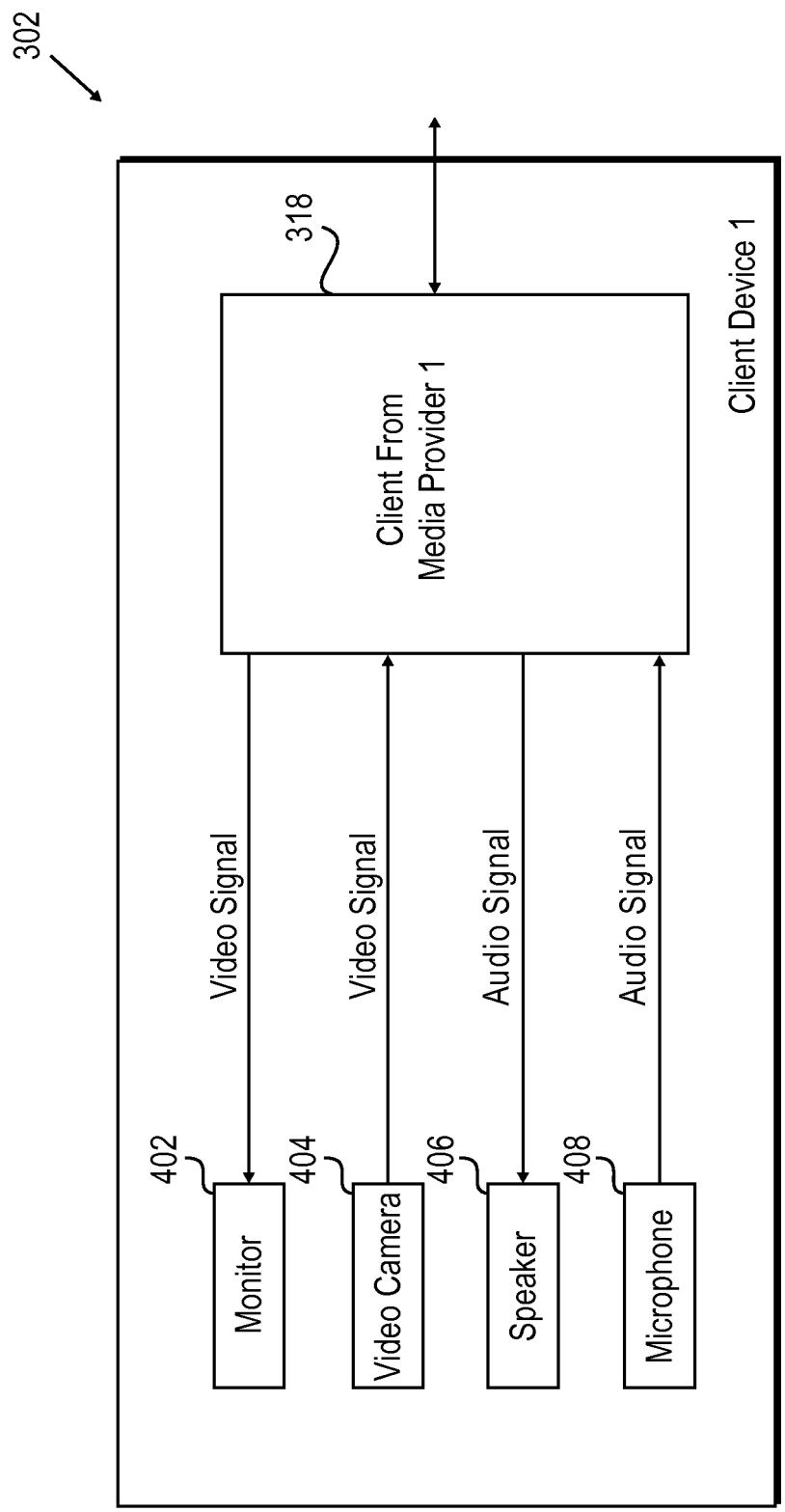
FIG. 4 depicts an exemplary client device, in accordance with some embodiments of the invention.

FIG. 4 provides further details regarding client device 302, in accordance with one embodiment of the invention. As depicted in FIG. 4, I/O devices 316 may comprise monitor 402, video camera 404, speaker 406 and microphone 408. Monitor 402 may receive a video signal from client application 318 and may display the video signal to a user (not depicted) of client device 302. Video camera 404 may capture frames of images into a video signal and transmit that video signal to client application 318. Speaker 406 may receive an audio signal and play the audio signal for the user of client device 302. Likewise, microphone 408 may capture sound into an audio signal and transmit that audio signal to client application 318. Such I/O devices may be used to facilitate a video conference. While other I/O devices, such as a keyboard, cursor-controlling device, remote control, etc., have not been depicted, such I/O devices may also be utilized to facilitate a video conference or other interactive media experience.

In some embodiments, client application 318 may process the audio and video (A/V) signals received from the I/O devices before transmitting an A/V stream (e.g., a time series of audio and video signals, not necessarily transmitted in sequential order) to network 310. The A/V stream that is transmitted to network 310 may be encoded into a format that is proprietary to a media provider (i.e., format known only to the media provider) of client application 318, such as the respective formats for Skype, WebEx and FaceTime communication. Alternatively, the A/V stream that is transmitted to network 310 may be encoded into a format that is not proprietary to any media provider, such as Real-time Transport Protocol (RTP) encoding, H.264 standards-based video encoding and G.722 standards-based audio encoding.

In some embodiments, client application 318 may receive an A/V stream from network 310. If necessary, client application 318 may decode the received A/V stream. A video signal (audio signal) may be extracted from the decoded A/V stream and transmitted to monitor 402 (speaker 406), respectively.

As depicted in FIG. 3, client device 304 may similarly comprise I/O devices 320 communicatively coupled with client application 322. The specific details of client device 304 may be similar to those of client device 302, and hence will not be repeated. Also depicted in FIG. 3, client device 306 may similarly comprise I/O devices 324 communicatively coupled with client application 326. The specific details of client device 306 may be similar to those of client device 302, and hence will not be repeated. Client applications 318, 322 and 326 may be from one or more media providers, such as Skype, WebEx, FaceTime and Blue Jeans Network. In the example of FIG. 3, client applications 318, 322 and 326 are from three separate media providers, but this is not necessarily so.

As an illustrative example, suppose client devices 302, 304 and 306 are all used to facilitate a video conference. A/V streams from each of client devices 302, 304 and 306 may be received at server 308. Such A/V streams may be first processed (described in detail below), if needed. The processed (or unprocessed) A/V streams may be received by media mixer 340, which composes two or more of the processed (or unprocessed) A/V streams into a composite stream. The composite stream may then be encoded into a format that is compatible with the first endpoint (more specifically, client application 318), a format that is compatible with the second endpoint (more specifically, client application 322) and a format that is compatible with the third endpoint (more specifically, client application 326). Throughout the description, each of the client devices may at times be referred to as a user endpoint of a video conference. The encoded A/V streams may then be sent to its corresponding user endpoint.

It is noted that the location of media mixer 340 in server 308 is exemplary. In one embodiment of the invention, media mixer 340 may be located in a server separate from server 308. In yet another embodiment of the invention, a media mixer may be present in each of the user endpoints. More specifically, the processed (or unprocessed) version of the A/V stream from client device 302, the processed (or unprocessed) version of the A/V stream from client device 304 and the processed (or unprocessed) version of the A/V stream from client device 304 may all be sent to client device 302, where a media mixer would combine the three A/V streams into one composite A/V stream, which would then be rendered to the user of client device 302. A similar description would apply to the media mixers at client devices 304 and 306.

The processing of the A/V streams at server 308 is now described. In one instance, the A/V stream that is received at server 308 is already in a format that is compatible with media mixer 340. If so, the A/V stream may be directly transmitted to media mixer 340 without any processing, such as the case for the A/V stream received from client device 306. For example, in the instance where client application 326 is a Blue Jeans application and media mixer 340 is that from Blue Jeans Network, the A/V stream transmitted by client application 326 could be directly provided to media mixer 340 without any intermediate processing by components 332 or 338.

In another case, the A/V stream that is received at server 308 is not in a format that is compatible with media mixer 340, but there is an application software development kit (SDK) available at server 308 that can be used to decode the A/V stream. If so, the A/V stream may be first decoded and then converted (e.g., encoded) into a format that is compatible with media mixer 340. This scenario is illustrated in FIG. 3 by the A/V stream provided by client device 304, which is received via application SDK 334 (e.g., application SDK 334 may decode the A/V stream) and then encoded by converter 336 before being transmitted to media mixer 340. In the reverse direction, converter 336 may receive an A/V stream from media mixer 340 and covert it into a format suitable for application SDK 334. Often, application SDK 334 and client application 322 are provided by the same media provider and could be the same binary program, one run by the user on their device (e.g., one of client devices 302, 304 and 306) and one run on a virtual machine of server 308. Application SDK 334 and converter 336 may be collectively viewed as transcoder 338. For example, in the instance where a client application 322 is a GTalk™ application and media mixer 340 is that from Blue Jeans Network, the A/V stream generated by client application 322 could be received via an application SDK provided by GTalk, decoded and re-encoded by a converter provided by Blue Jeans Network, and then transmitted to media mixer 340.

In the last case, the A/V stream that is received at server 308 is not in a format that is compatible with media mixer 340, and no application SDK is available at server 308 that can be used to decode the A/V stream. In such a case, the A/V stream may be terminated in the cloud (i.e., an endpoint for the A/V stream may be created in server 308). This scenario is illustrated in FIG. 3 by the A/V stream provided by client device 302, which is terminated in the cloud by client application 328. Client application 328 "virtually" plays the received A/V stream similar to how client application 318 might play a received A/V stream. The only difference is that the audio and video output signals of client application 328 are not transmitted to an actual monitor and speaker, but rather are captured by capture devices. Such arrangement is depicted in more detail in FIG. 5.

Figure 5:
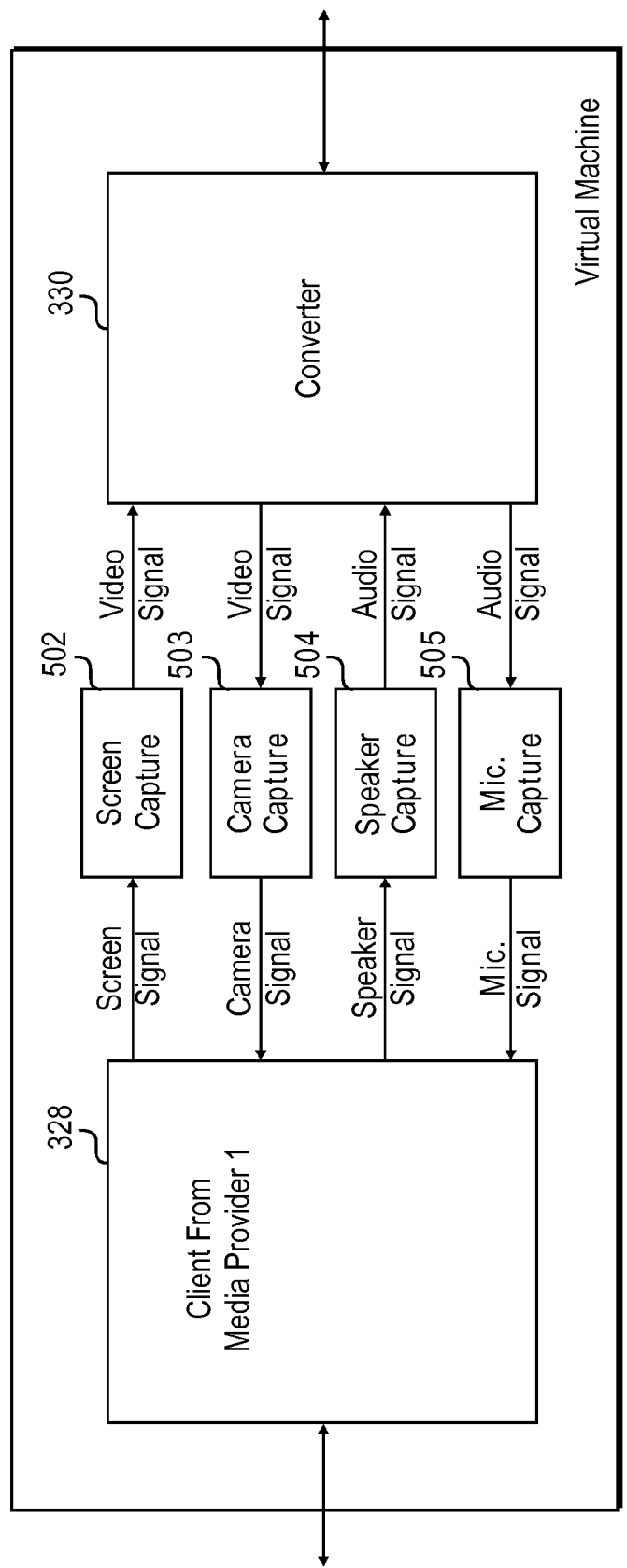
FIG. 5 depicts an exemplary virtual machine, in accordance with some embodiments of the invention.

As depicted in FIG. 5, the screen signal generated by client application 328 may be captured (i.e., may be temporarily stored) by screen capture device 502 (which may act like a buffer). Similarly, the speaker signal generated by client application 328 may be captured (i.e., may be temporarily stored) by speaker capture device 504 (which may act like a buffer). The captured audio and video signals may then be provided to converter 330, which encodes the received A/V signals into a format that is compatible with media mixer 340. In the reverse direction, converter 330 may receive an A/V stream from media mixer 340. Converter 330 may extract a video signal from the A/V stream and convert it into a format that can be received by the video camera input of client application 328. The video signal from converter 330 may be provided to camera capture device 503 (which may act like a buffer). Likewise, converter 330 may extract an audio signal from the A/V stream and convert it into a format that can be received by the microphone input of client application 328. The audio signal from converter 330 may be provided to microphone capture device 505 (which may act like a buffer).

Figure 6:
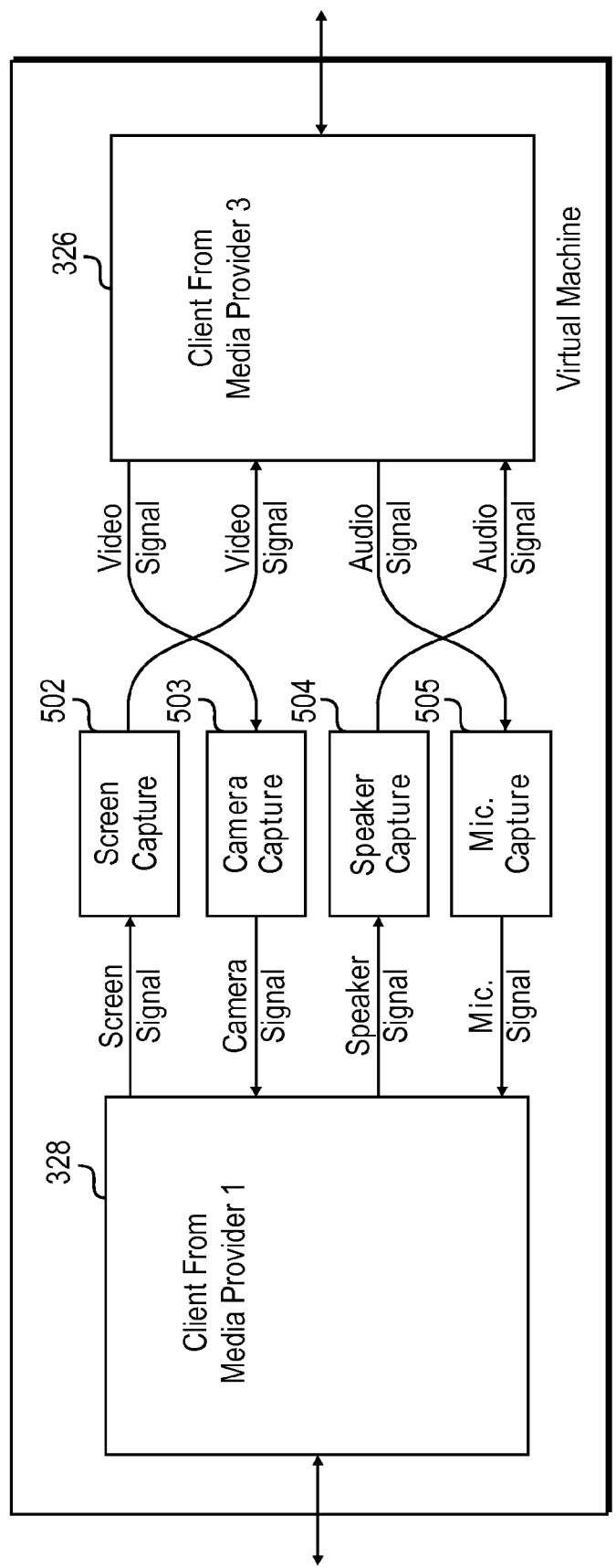
FIG. 6 depicts an exemplary virtual machine, in accordance with some embodiments of the invention.

Upon studying FIG. 3 in detail, one will realize that client application 326 is precisely a component that can function as converter 330. Client application 326 is designed to communicate with media mixer 340 without any conversion/transcoding (note connection from client application 326 to media mixer without any conversion blocks therebetween). Further, client application 326 is designed to receive a video/audio signal input and produce a video/audio signal output, which perfectly couples with the I/O of client application 328. FIG. 6 illustrates a specific embodiment of the system depicted in FIG. 5, in which converter 330 has been substituted with another instance of client application 326. By comparing FIGS. 4 and 6, one can conceptually understand that the functionality of client application 326 and 318 is essentially unchanged whether the I/O is produced by actual I/O devices 320, 322, 324 and 326 or another client application 328.

Returning to FIG. 3, the remaining detail yet to be described is client application 328 executing on virtual machine 332. As is known in the art, a virtual machine is not an imaginary or conceptual machine, but rather is an execution environment (typically on a server) that has access to one or more processors, memory, disk drives, network interface cards, and so on. See page 64 of Silberschatz et al. "Operating System Concepts", John Wiley & Sons, Inc. (2005). While one or more virtual machines may be instantiated on a single server, the processes of two different virtual machines typically do not interfere with one another (i.e., one virtual machine will not write over the data of another virtual machine, etc.) In the present case, client application 328 may be executed on a virtual machine, for example, provided by Amazon Web Services (AWS). Since client application 328 is built as a user facing application that makes use of devices such as cameras, speakers, microphones, displays on a user's device, client application 328 is generally built to run as the only copy of the client application on a machine. Hence, each instance of client application 328 is best run its own virtual machine.

Figure 7:
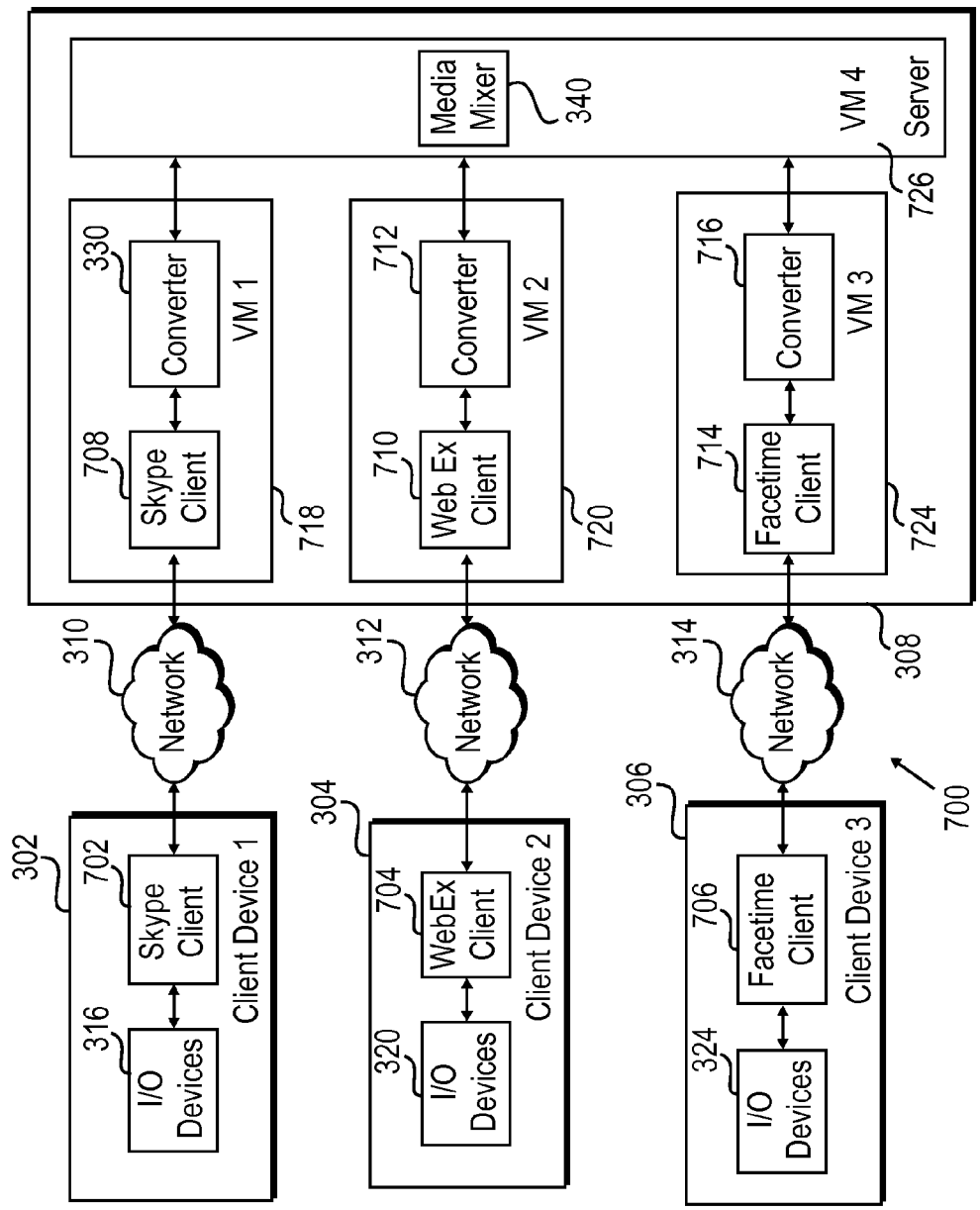
FIG. 7 depicts an exemplary video conference system, in accordance with some embodiments of the invention.

FIG. 7 depicts system 700, in which a plurality of virtual machines are deployed in a server to facilitate a video conference. The user of client device 302 participates in the video conference via Skype client 702; the user of client device 304 participates in the video conference via WebEx client 704; and the user of client device 306 participates in the video conference via FaceTime client 706. Since the software development kit (SDK) of Skype, WebEx and FaceTime are not publicly available, each of the A/V streams from client devices 302, 304 and 306 must be terminated in the cloud so that the three heterogeneous client applications may communicate with one another. In the example of FIG. 7, Skype client 708 executes on virtual machine 718, WebEx client 710 executes on virtual machine 720 and FaceTime client 714 executes on virtual machine 724. Further, media mixer 340 executes on virtual machine 726. While all four virtual machines are depicted as being instantiated on the same server, this is not necessarily so, as they may be instantiated on separate servers.

It is noted that each of virtual machines 718, 720 and 724 have been depicted as comprising a client application and a converter, while this is not necessarily so. In another embodiment, one or more of converters 330, 712 and 716 may be located in virtual machine 726.

Figure 8:
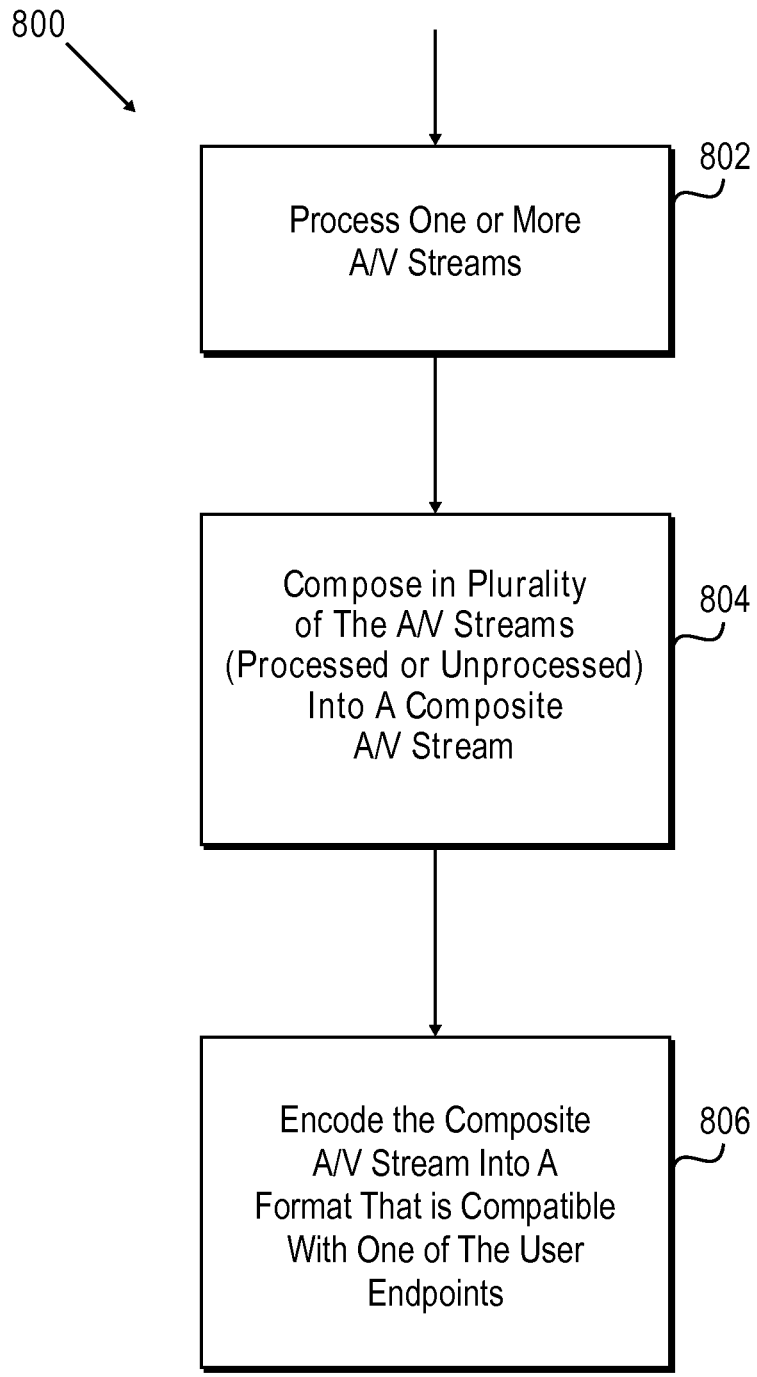
FIG. 8 is a flowchart of an exemplary process for processing one or more audio/video (A/V) streams, in accordance with some embodiments of the invention.
Figure 9:
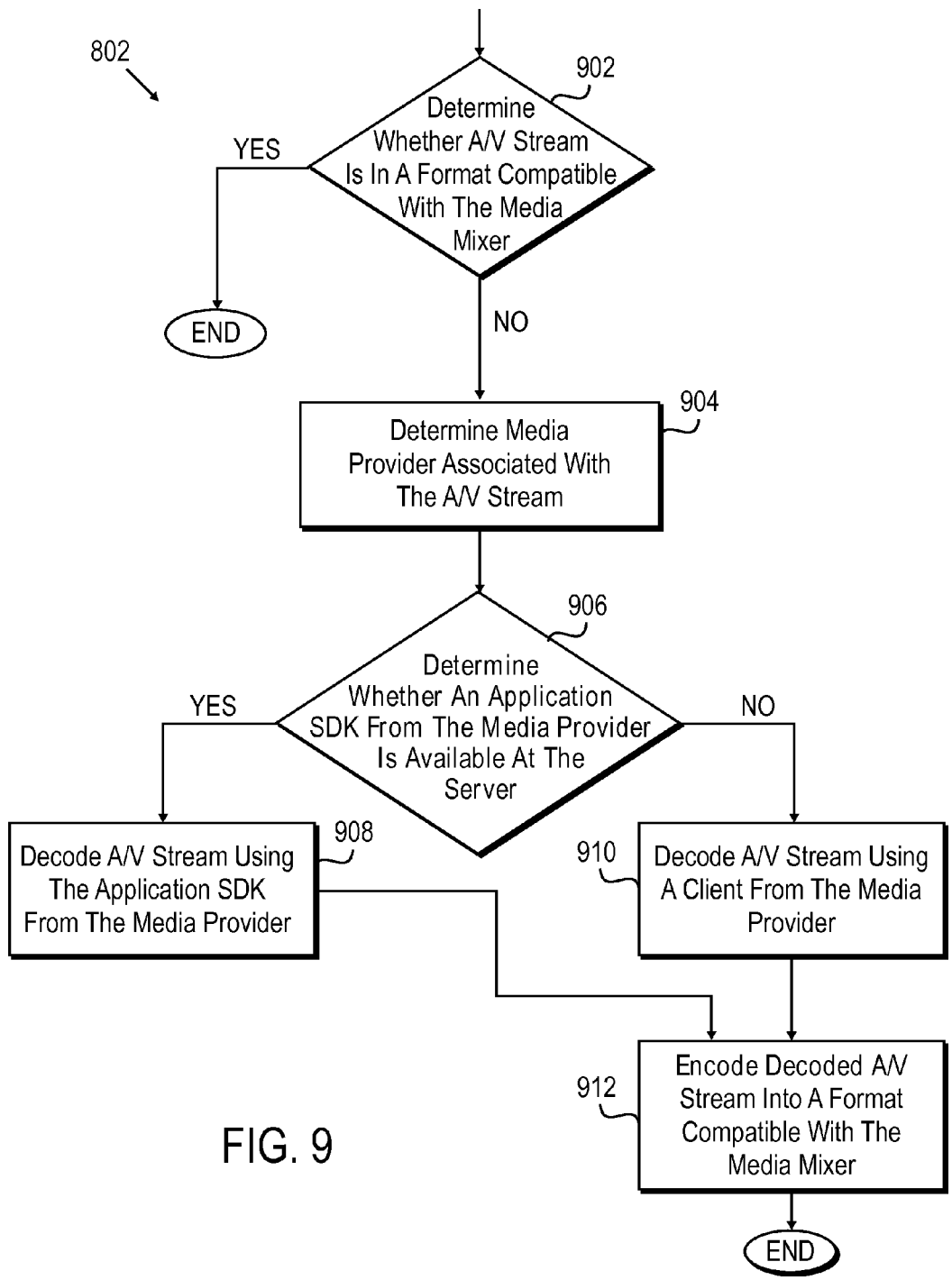
FIG. 9 is a flowchart of an exemplary process for processing one or more A/V streams, in accordance with some embodiments of the invention.

FIGS. 8 and 9 depict flow diagrams of processes that may be performed in association with the systems depicted in FIGS. 3-7. In step 802 of flow diagram 800, a server may process one or more of a plurality of A/V streams, such processing described in further detail below in FIG. 9. The server may then compose a plurality of the processed (possibly including some unprocessed A/V streams) into a composite A/V stream (step 804). The server may then encode the composite A/V stream into a format that is compatible with at least one of the user endpoints (step 806). As previously discussed, step 806 may alternatively be performed at a client device, instead of at a server.

FIG. 9 provides further details of processing the one or more A/V streams (i.e., step 802), in accordance with some embodiments of the invention. At step 902, the server may determine whether an A/V stream (i.e., an A/V stream received by the server) is in a format that is compatible with a media mixer. If so, the A/V stream may not be processed and the process ends. If not, the server may determine a media provider associated with the A/V stream (step 904). As previously described, such media provider may be Skype, WebEx, FaceTime or Blue Jeans. At step 906, the server may determine whether an application SDK from the media provider is available at the server. If so, the server may decode the A/V stream using the application SDK from the media provider (step 908). If not, the server (i.e., a virtual machine thereof) may decode the A/V stream using a client application from the media provider (step 910). As previously described, such client application may be a Skype client application, a WebEx client application, a FaceTime client application, or a Blue Jeans client application. Finally, the server may encode the decoded A/V stream into a format that is compatible with the media mixer (step 912).

Returning to the discussion of deploying one or more virtual machines on a server, the inventors have observed that there often is a significant degree of variability associated with the load at the one or more servers. At a low activity period (e.g., over the weekends), there might be the need for 100 virtual machines, while at a peak activity period (e.g., over the weekdays), there might be the need for 1000 virtual machines. One solution might be to deploy a constant number of virtual machines, the number exceeding the need at any peak activity period. While such an approach would function appropriately, it would not be cost-effective. Indeed, it is costly to deploy a virtual machine (e.g., every minute that a virtual machine is deployed might cost a dollar). Another solution might be to deploy virtual machines in response to a given need. While such approach would be cost effective, it would not service user's request in a timely manner (i.e., there is a noticeable time delay between the instant a command is received to deploy a virtual machine to the instant when a client application on the deployed virtual machine is ready to process an A/V stream).

Figure 10:
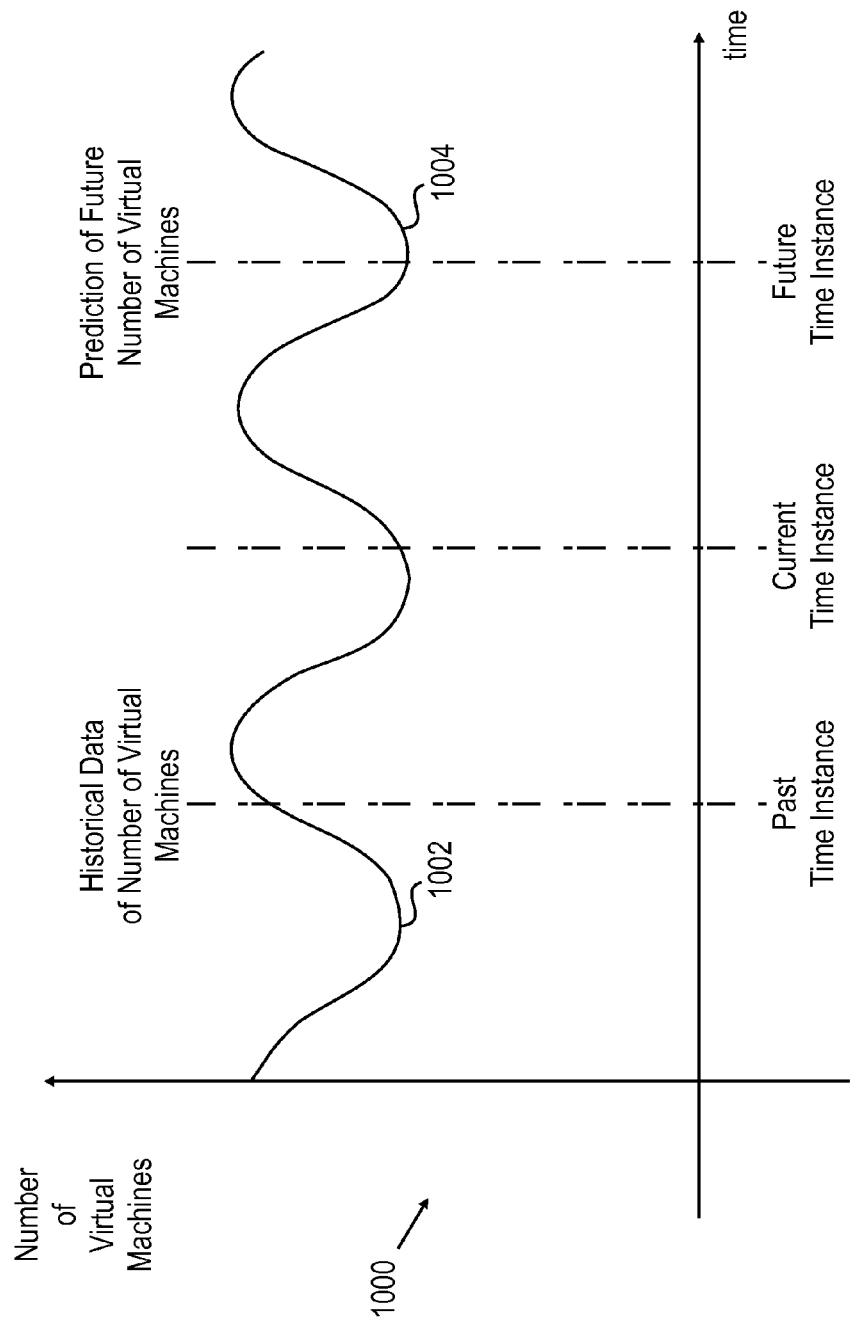
FIG. 10 is a plot for illustrating a load prediction scheme, in accordance with some embodiments of the invention.

For an approach that is both cost-effective and responsive to user need in a timely fashion, the inventors realized that load prediction is necessary (i.e., predicting future number of virtual machines that are needed from a historical record of the number of virtual machines that were deployed in the past). FIG. 10 provides plot 1000 to more easily describe load prediction. Plot 1000 depicts curve 1002 (in solid line) of the historical data of the number of virtual machines over time (i.e., time series of the past number of virtual machines). Plots 1000 also depicts curve 1004 (in dashed line) of a prediction of the future number of virtual machines over time (i.e., time series of the future number of virtual machines). A future number of virtual machines may be estimated from a time series of the past number of virtual machines using well-known techniques in the art such as the Kalman filter. Such estimation (i.e., prediction) can be performed on a daily, weekly or monthly basis, since patterns of usage generally repeat in cycles with similar time periods (e.g., periods of a day, a week, or a month).

Figure 11:
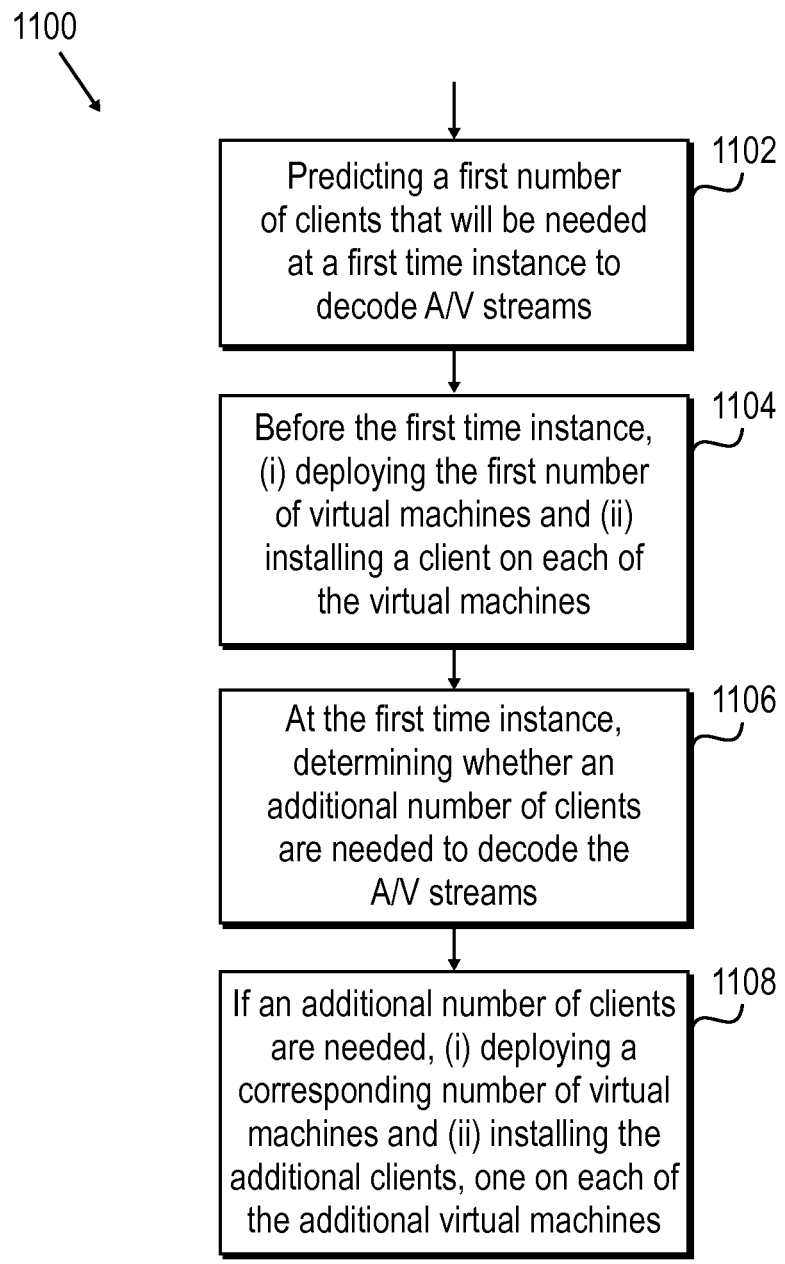
FIG. 11 is a flowchart of an exemplary process for load prediction, in accordance with some embodiments of the invention.

FIG. 11 depicts flowchart 1100 of an exemplary process of using load prediction to dynamically adjust the number of virtual machines that are deployed at any time instance. At step 1102, a server (or a client device) may predict a first number of client applications that will be needed at a first time instance (i.e., first time instance in the future) to process (e.g., decode and/or encode) A/V streams. Before the first time instance, the server may (i) deploy the first number of virtual machines and (ii) install a client application on each of the virtual machines (step 1104). At the first time instance, the server may determine whether an additional number of client applications are needed to decode the A/V streams (step 1106). If an additional number of client applications are needed, the server may (i) deploy a corresponding number of additional virtual machines and (ii) install the additional number of client applications, one on each of the additional virtual machines (step 1108). The determination of whether additional client applications are needed can be done based on a low water mark (e.g., if the number of idle clients servicing requests falls below a low threshold). The idea is to use a predictive scaling model in step 1102 with a water mark based model in step 1106.

FIGS. 12-16 illustrate embodiments of the invention directed at incorporating the content from one or more web-based media sources (e.g., YouTube video, Dropbox document, and other content from web applications such as SalesForce, WebEx and SlideShare) into a video conference. Currently, it is possible to incorporate content from web-based media sources into a video conference by using desktop sharing, screen sharing or similar tools. Content from a web-based media source may be displayed locally on a client device and the image on the display of the client device may then be shared with other client devices that are part of the video conference. While such process may function correctly, it may significantly increase the load on the network, switches, etc., and other processes that facilitate the video conference. Indeed, the content from the web-based media source must be first transferred to a client device, and from that client device, the content must then be transferred to each of the other client devices.

Figure 12:
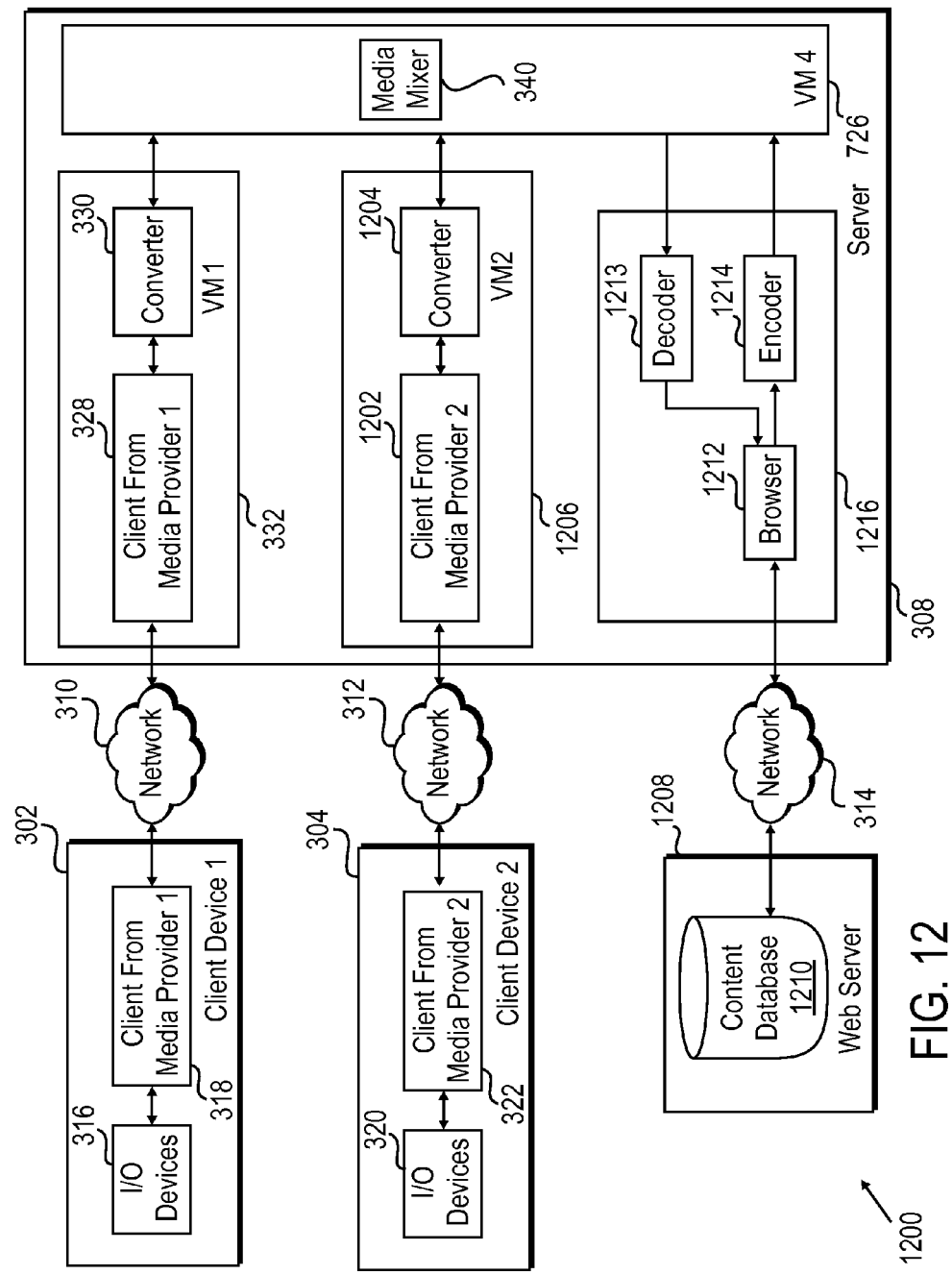
FIG. 12 depicts an exemplary video conference system, in accordance with some embodiments of the invention.

In accordance with certain embodiments of the invention, a more efficient process is employed, in which content from a web-based media source is directly incorporated into a video conference without using desktop sharing (or similar tools). FIG. 12 depicts a system that employs such a process. System 1200 facilitates a video conference between the users of client devices 302 and 304, using substantially the same techniques described above in association with FIGS. 3-11. In system 1200, the A/V streams of client devices 302 and 304 are terminated in the cloud by client applications 328 and 1202, and then converted by converters 330 and 1204 into a format compatible with media mixer 340. As described above, the A/V streams do not necessarily need to be terminated in the cloud. Instead, the A/V streams of client devices, in other instances, could be directly provided to media mixer 340, and in yet other instances, could be provided to media mixer 340 after a transcoding operation. Such details have been discussed above.

In contrast to the embodiments of FIGS. 3-11, media mixer 340 of FIG. 12 has the ability to receive an A/V stream directly from web server 1208. While one web server has been depicted for ease of illustration, one or more Web servers may be present in system 1200. Web server 1208 may be operated by Dropbox (from San Francisco, Calif.), in which case, the Web server may store documents/images/etc. in content database 1210. Alternatively, web server 1208 may be operated by YouTube (from Google of Mountain View, Calif.), in which case, the Web server may store videos in content database 1210. Alternatively, web server 1208 may be operated by Picasa (also from Google of Mountain View, Calif.), in which case, the Web server may store images in content database 1210.

Browser 1212 is present in the cloud (i.e., executes in server 308, or more particularly may execute in virtual machine 1216 of server 308), and may interface Web server 1208 with media mixer 340. Browser 1212 may virtually render a media signal from Web server 1208. That is, browser 1212 may render a media signal just as a browser on a client device typically renders a media signal, except that the rendered form of the media signal is provided to capture devices, instead of physical I/O devices (e.g., monitor, speakers).

Figure 13:
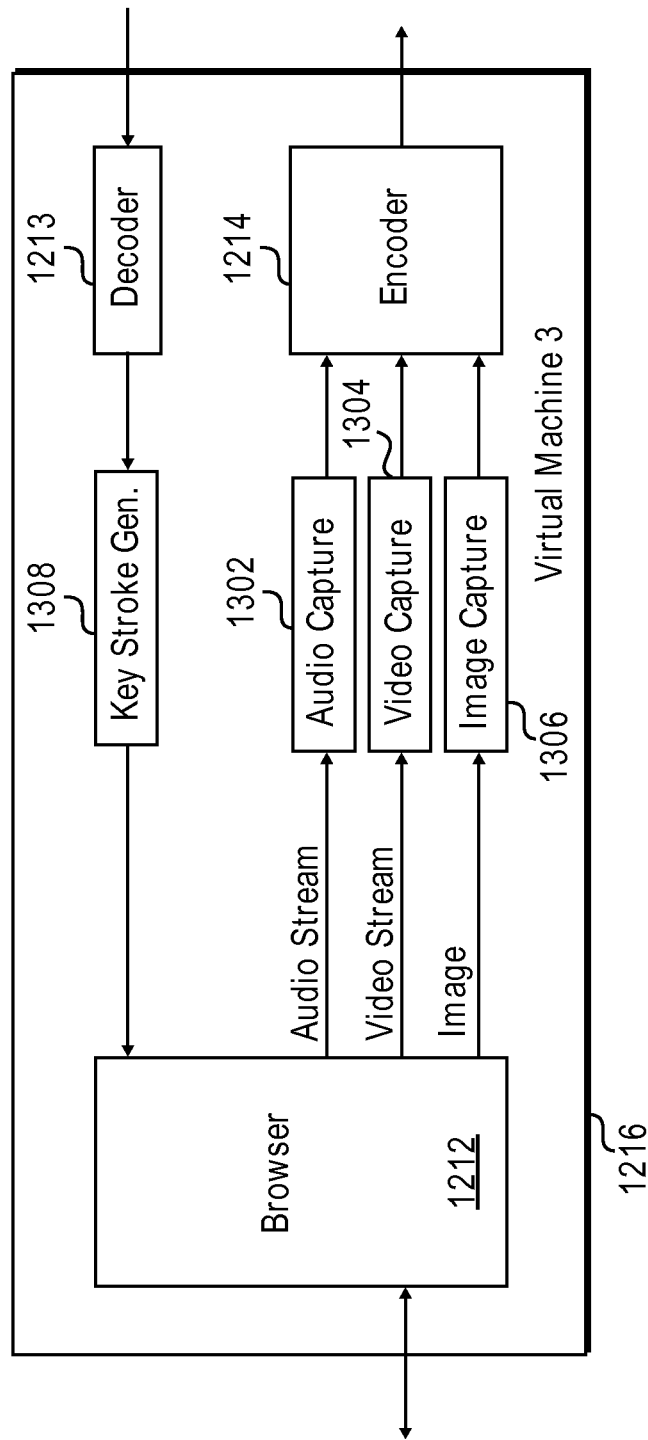
FIG. 13 depicts an exemplary virtual machine, in accordance with some embodiments of the invention.

As depicted in FIG. 13, browser 1212 may render a media signal into one or more of an audio stream (which is then captured by audio capture device 1302) a video stream (which is then captured by video capture device 1304) and an image (which is then captured by image capture device 1306). A video stream may comprise a video advertisement, which may be inserted into the beginning and/or middle of a free video conference as a revenue generating mechanism. An image may comprise a picture, a document (i.e., Word document, Excel document, PDF document, etc.) a webpage, web-style banner, etc. While not depicted, browser 121 may further render a media signal into text, which may allow an alert or other types of messages to be sent to users at the beginning, middle or end of a video conference. One or more of the captured audio stream, the captured video stream and the captured image may be transmitted to encoder 1214, which encodes such captured media into a format that is compatible with media mixer 340. The data received from encoder 1214 may be loosely referred to as an A/V stream, although in some instances, there may be only an audio stream, only a video stream, only a single image, etc., rather than both an audio and video stream. In contrast to virtual machines 332 and 1206, virtual machine 1216 may only provide data to media mixer 340 and not receive any data from media mixer 340.

As further depicted in FIG. 12, browser 1212 may receive input from one or more client devices 302, 304. For example, client device 302 may provide command in the form of dual-tone multi-frequency (DTMF) signals. Such DTMF signals may be transmitted from client device 302 to browser 1212 by way of a signal path created via network 310, virtual machine 332, virtual machine 726 and decoder 1213. More particularly, as depicted in FIG. 13, DTMF signals (or other signals) may be received by decoder 1213, which decodes the DTMF signals into a form that is compatible with key stroke generator 1308. Key stroke generator 1308 may then convert the decoded DTMF signals into key stroke input which is then provided to browser 1212. Essentially, decoder 1213 and key stroke generator 1308 may transform command signals from a touchtone device at client device 302 to appear as keyboard input to browser 1212.

In some embodiments, browser 1212 (and possibly encoder 1214) may execute on virtual machine 1216. In the instance where there are multiple web-based media sources, there may be multiple browsers executing in the cloud, one for each of the web-based media sources. Like the client applications executing in the cloud, each browser may execute in its own virtual machine or multiple browser applications can be run on a single server or single virtual machine in a "headless" manner (i.e., with no user interface rendered in a visible manner). As the load in the server will likewise fluctuate with the number of browsers executing in the cloud, the load prediction algorithm described in association with FIGS. 10-11 may likewise be applied to deploy a predicted number of virtual machines to accommodate a predicted need for browsers.

Figure 14:
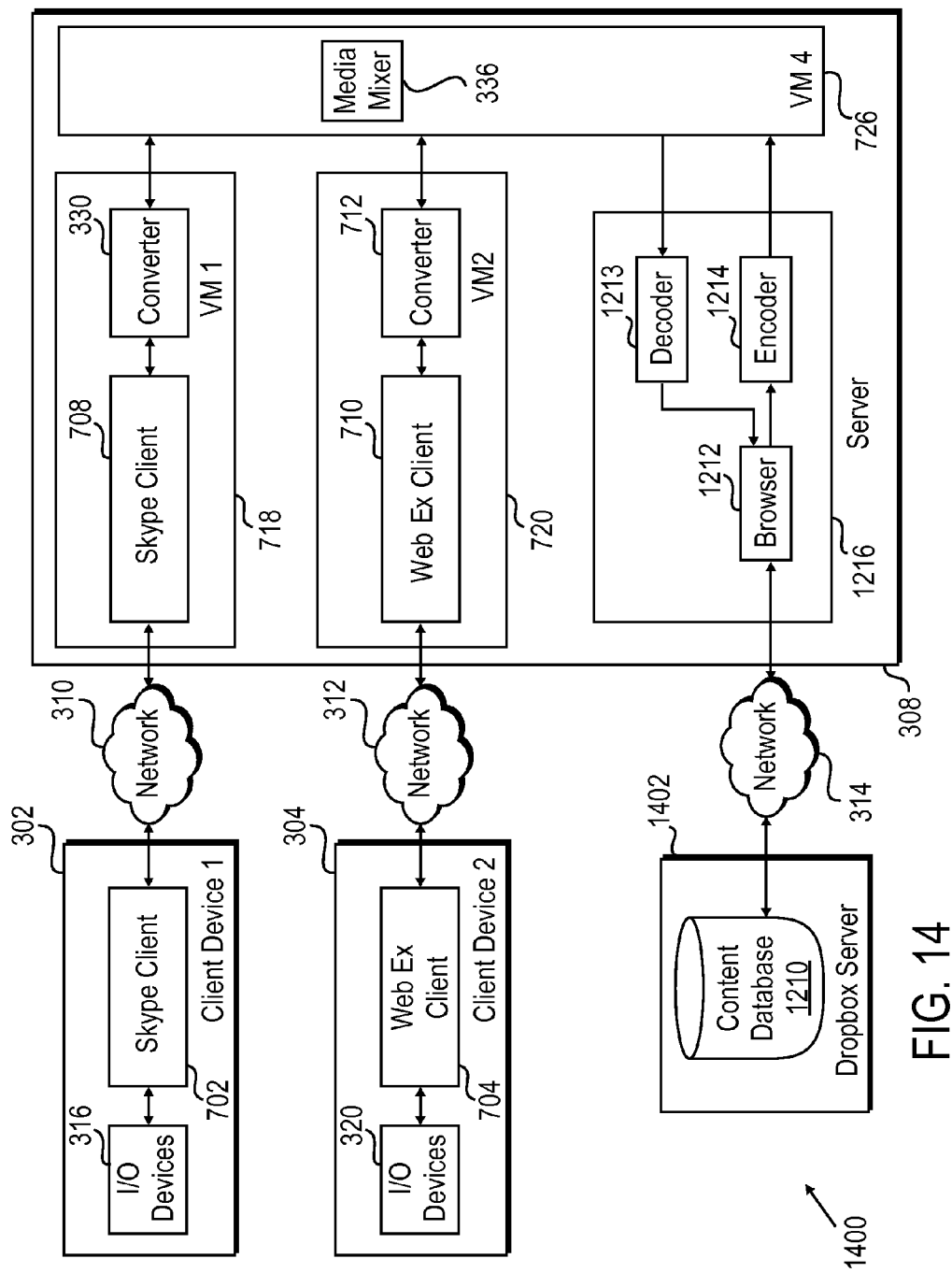
FIG. 14 depicts an exemplary video conference system, in accordance with some embodiments of the invention.

As a more specific embodiment of system 1200 of FIG. 12, system 1400 of FIG. 14 facilitates a video conference between a Skype user and a WebEx user, and further facilitates documents from Dropbox (i.e., Dropbox server 1402) to be incorporated into the video conference.

Figure 15:
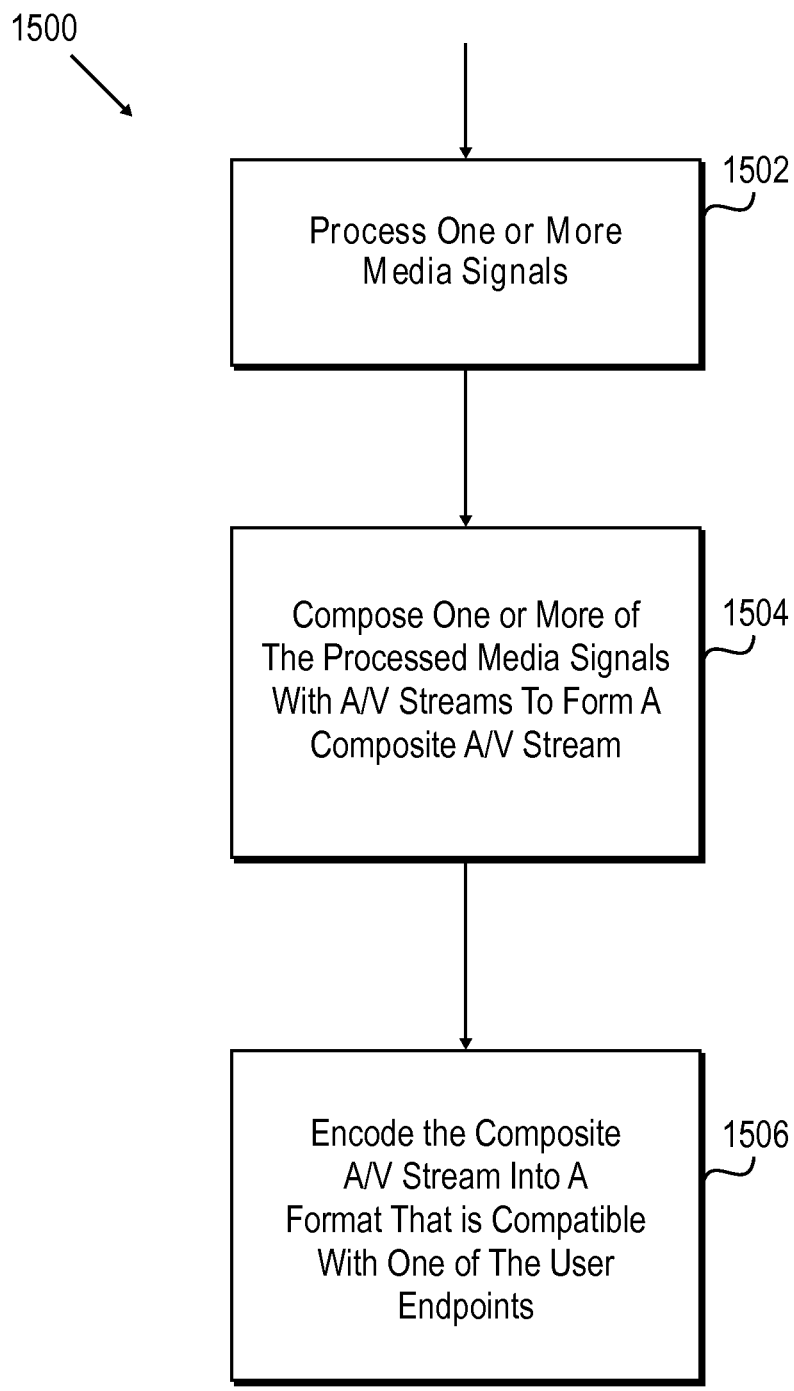
FIG. 15 is a flowchart of an exemplary process for interfacing a web-based media source with a video conference, in accordance with some embodiments of the invention.
Figure 16:
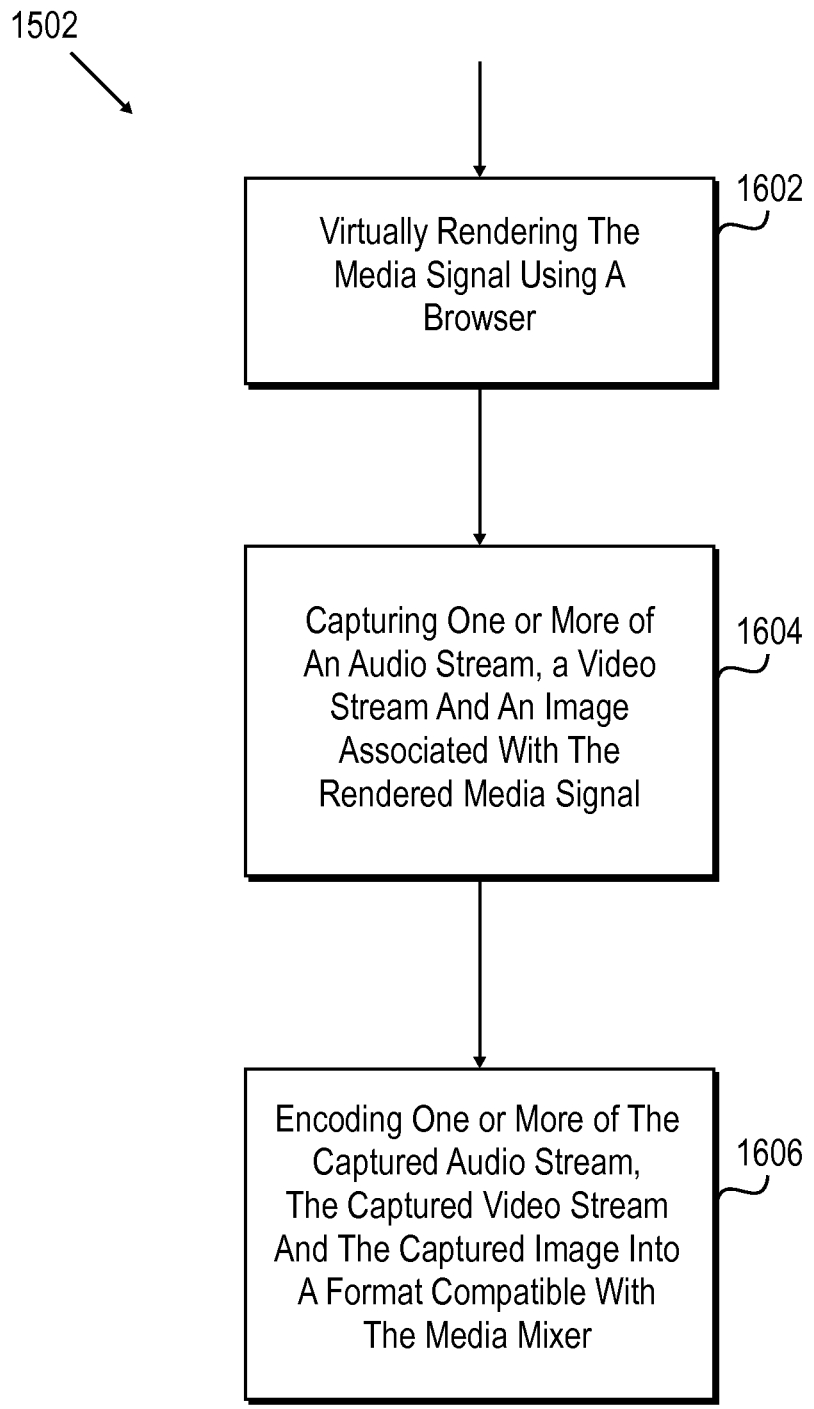
FIG. 16 is a flowchart of an exemplary process for interfacing a web-based media source with a video conference, in accordance with some embodiments of the invention.

FIGS. 15 and 16 depict flow diagrams of processes that may be performed in association with the systems depicted in FIGS. 12-14. At step 1502 of flow diagram 1500, the server may process one or more media signals, such processing described in further detail below in FIG. 16. At step 1504, the server may compose one or more of the processed media signals with one or more A/V streams so as to form a composite A/V stream. At step 1506, the server may encode the composite A/V stream into a format that is compatible with one of the user endpoints.

FIG. 16 provides further details of processing the one or more media signals (i.e., step 1502), in accordance with some embodiments of the invention. At step 1602, the server (or more specifically, a virtual machine thereof) may virtually render a media signal using a browser. The server (or more specifically, a virtual machine thereof) may then capture one or more of an audio stream, a video stream and an image associated with the rendered media signal (step 1604). The server may then encode one or more of the captured audio stream, the captured video stream and the captured image into a format that is compatible with the media mixer (step 1606).

In one embodiment of the invention, web server 1208 may host an interactive video response (IVR) system 1702 (and/or an interactive voice and video response (IVVR) system).

An advantage of such implementation of an IVR system is that IVR screens (e.g., user interface screens displayed on IVR system 1702) can be authored using web scripting languages (e.g., HTML, JavaScript), so there is no need to author the IVR screens using flash code, which may be more difficult to code. IVR screens can be authored using dynamic logic (e.g., condition on certain user input, a certain IVR screen may be displayed after another IVR screen) similar to how web pages can be dynamic as well as database-driven.

Figure 17:
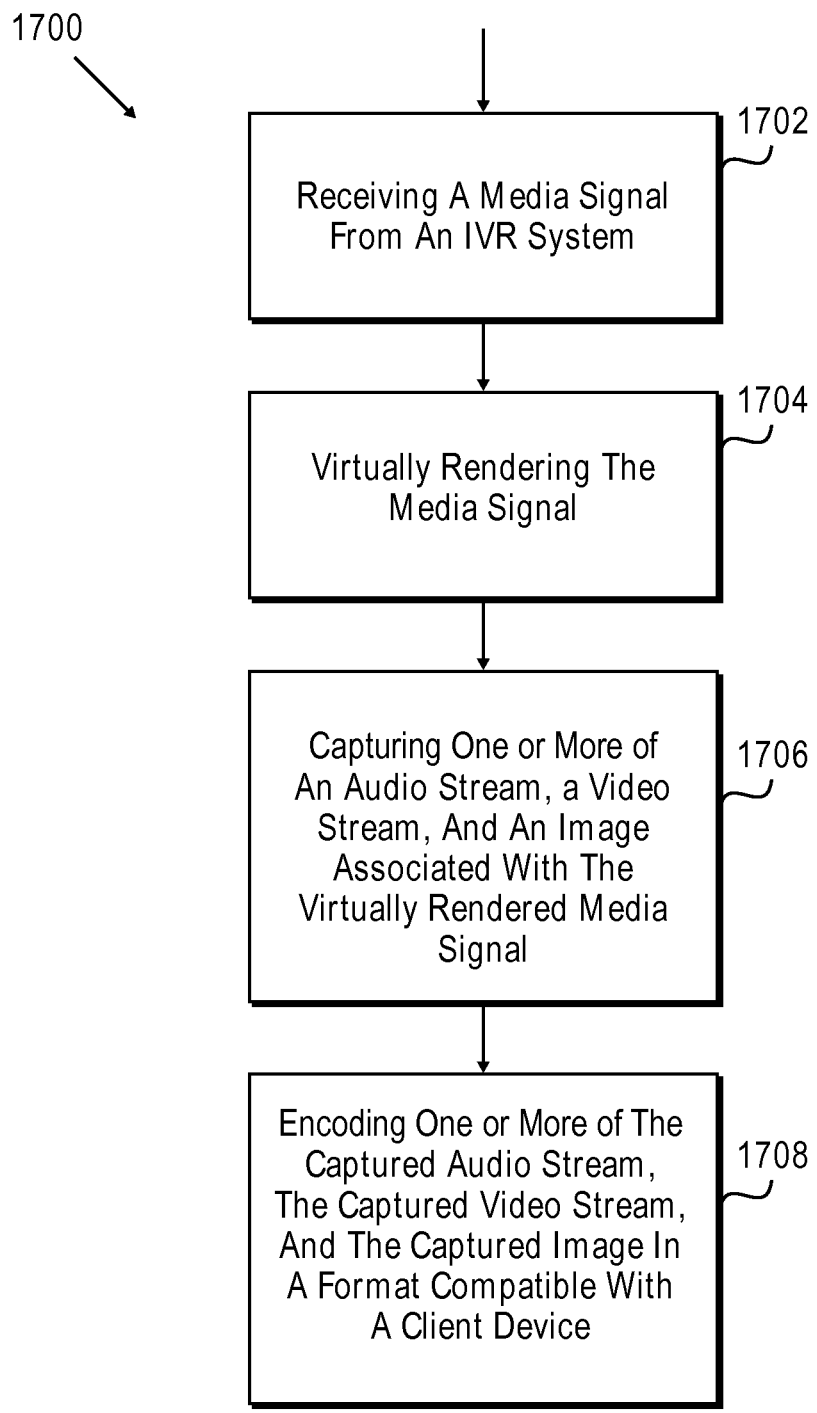
FIG. 17 is a flowchart of an exemplary process for providing a media signal from an interactive video response (IVR) system (hosted on a web server) to an endpoint of a video conference system.

FIG. 17 depicts a flow diagram of a process that may be performed in association with the system depicted in FIG. 12, in the instance that an IVR system is hosted on web server 1208. At step 1702 of flow diagram 1700, the server (or more particularly a virtual machine thereof) may receive a media signal from an IVR system. At step 1704, the server (or more particularly a virtual machine thereof) may virtually render the media signal. At step 1706, the server (or more particularly a virtual machine thereof) may capture one or more of an audio stream, a video stream and an image associated with the virtually rendered media signal. At step 1708, the server (or more particularly a virtual machine thereof) may encode one or more of the captured audio stream, the captured video stream and the captured image into a format that is compatible with an endpoint of a video conference system.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Figure 18:
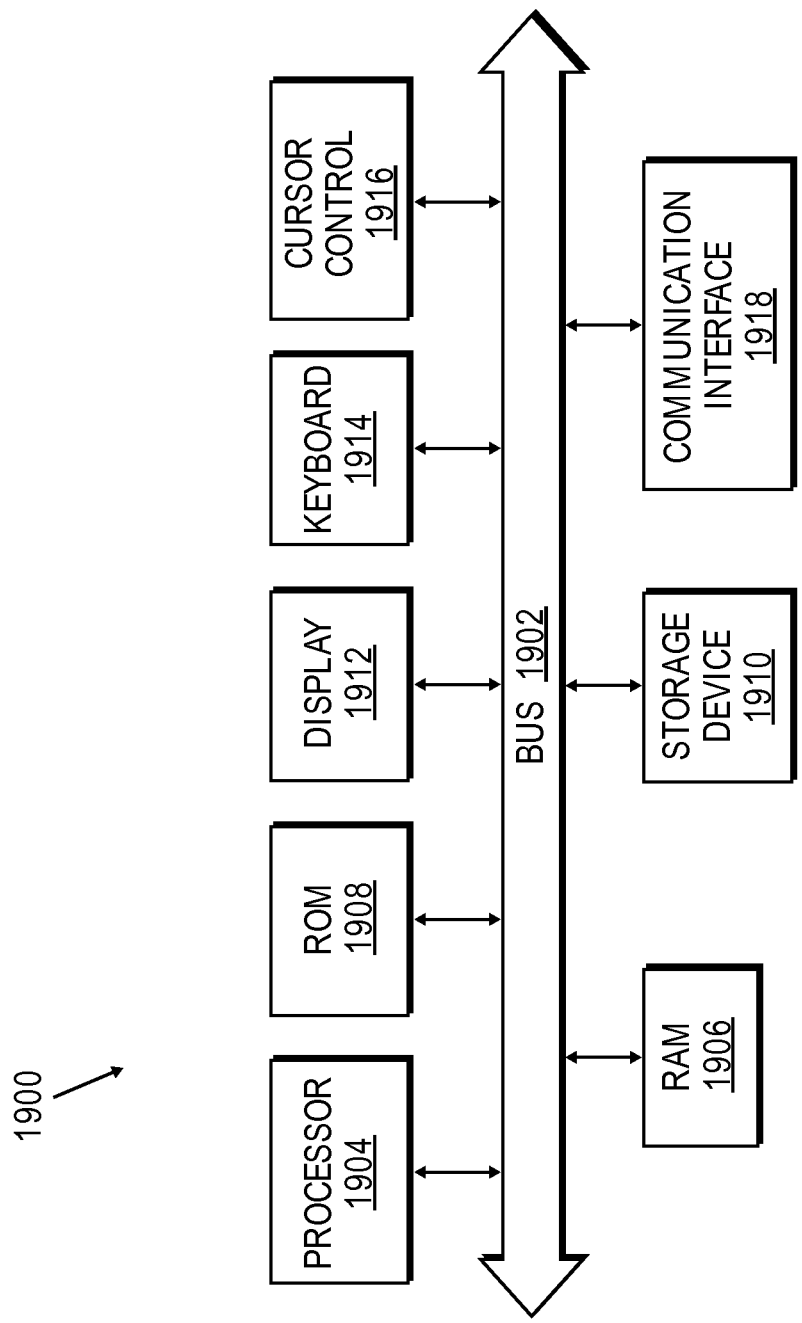
FIG. 18 depicts components of a computer system in which machine-readable instructions instantiating the methods of the present invention may be stored and executed.

Further the procedures described herein may involve the use of various computer systems and computer readable storage media having computer-readable instructions stored thereon. FIG. 18 provides an example of a computer system 1900 that is representative of any of the computer systems or electronic devices discussed herein. Note, not all of the various computer systems may have all of the features of computer system 1900. Computer systems such as computer system 1900 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 1900 includes a bus 1902 or other communication mechanism for communicating information, and a processor 1904 coupled with the bus for processing information. Computer system 1900 also includes a main memory 1906, such as a random access memory (RAM) or other dynamic storage device, coupled to the bus for storing information and instructions to be executed by the processor. Main memory 1906 also may be used for storing temporary variables or other intermediate information during execution of instructions to be executed by processor 1904. Computer system 1900 may further include a read only memory (ROM) 1908 or other static storage device coupled to the bus for storing static information and instructions for the processor 1904. A storage device 1910, which may be one or more of a hard disk, flash memory-based storage medium, or other storage medium, may be provided and coupled to the bus 1902 for storing information and instructions (e.g., operating systems, applications programs and the like).

Computer system 1900 may be coupled via the bus 1902 to a display 1912, such as a liquid crystal or light emitting diode display, for displaying information to a user. An input device 1914, such as a keyboard including alphanumeric and other keys, may be coupled to the bus 1902 for communicating information and command selections to the processor. In some embodiments, the keyboard will be a software construct rendered via a touch screen display 1912. Another type of user input device is cursor control device 1916, such as a mouse, a trackball, cursor direction keys, and/or any other input device for communicating direction information and command selections to processor 1904 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented by processor 1904 executing appropriate sequences of computer-readable instructions contained in main memory 1906. Such instructions may be read into main memory from another computer-readable medium, such as storage device 1910, and execution of the sequences of instructions contained in the main memory may cause the processor to perform the associated actions. In alternative embodiments, hard-wired circuitry or firmware-controlled processing units (e.g., field programmable gate arrays) may be used in place of or in combination with processor 1904 and its associated computer software instructions to implement the invention. The computer-readable instructions may be rendered in any computer language including, without limitation, C#, C/C++, assembly language, markup languages (e.g., HTML, SGML, XML, VoXML), JavaScript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 1900 or similar electronic computing device, that manipulates and transforms data represented as physical (electronic) quantities within its registers and memories into other data similarly represented as physical quantities within its memories or registers or other such information storage, transmission or display devices.

Computer system 1900 may also include a communication interface 1918 coupled to the bus 1902. Communication interface 1918 may provide a two-way data communication channel with a computer network, such as a network, which provides connectivity to and among the various servers and/or client devices discussed above. For example, communication interface 1918 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 1900 can send and receive messages and data through the communication interface 1918 and in that way communication with hosts and/or client devices accessible via the Internet. Computer system 1900 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 1900, and are often characterized by having storage mediums capable of accommodating significant amounts of information.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method for processing audio/video (A/V) streams of a video conference at one or more servers, the method comprising:
   for each of a plurality of user endpoints of the video conference:
      receiving an A/V stream, the A/V stream encoded in a format that is proprietary to a media provider of the A/V stream; and
      transcoding the A/V stream by (i) decoding the A/V stream using a client application from the media provider, the client application executing at a virtual machine instantiated on the one or more servers, and (ii) encoding the decoded A/V stream into a format that is compatible with a media mixer,
   wherein each of the virtual machines instantiated on the one or more servers only executes a single client application, and
   wherein load prediction is employed to minimize a number of virtual machines that are instantiated on the one or more servers at any time instance, the load prediction comprising:
      predicting a first number of client applications that will be needed at a first time instance to decode the A/V streams received at the one or more servers;
      before the first time instance, (i) deploying the first number of virtual machines on the one or more servers, and (ii) installing the first number of client applications, one on each of the deployed virtual machines;
      at the first time instance, determining whether an additional number of client applications are needed to decode the A/V streams, the additional number of client applications in excess of the first number of client applications; and
      if an additional number of client applications are needed, (i) deploying a corresponding number of additional virtual machines on the one or more servers, and (ii) installing the additional number of client applications, one on each of the additional virtual machines.

2. The method of claim 1, further comprising:
   composing, at the media mixer, a plurality of the transcoded A/V streams into a composite A/V stream; and
   encoding the composite A/V stream into a format that is compatible with one of the user endpoints.

3. The method of claim 1, wherein decoding, at the virtual machine, the A/V stream using the client from the media provider comprises:
   virtually playing the A/V stream using the client from the media provider;
   capturing the audio stream of the played A/V stream; and
   capturing the video stream of the played A/V stream.

4. The method of claim 1, wherein for each of the plurality of user endpoints of the video conference, the virtual machine receives the A/V stream from a client application executing at a user device, wherein the client application executing at the virtual machine is identical to the client application executing at the user device, wherein the user device comprises one or more of a desktop computer, a tablet computing device and a smartphone.

5. The method of claim 1, wherein for each of the plurality of user endpoints of the video conference, the virtual machine receives the A/V stream from a client application executing at a user device, wherein the client application executing at the virtual machine is compatible with the client application executing at the user device, wherein the user device comprises one or more of a desktop computer, a tablet computing device and a smartphone.

6. The method of claim 1, wherein for each of the plurality of user endpoints of the video conference, the media provider comprises one of Skype, WebEx, FaceTime and Blue Jeans Network.

7. The method of claim 1, wherein for each of the plurality of user endpoints of the video conference, the client application from the media provider comprises one of a Skype client application, a WebEx client application, a FaceTime client application, and a Blue Jeans client application.

8. The method of claim 1, wherein predicting the first number of client applications that will be needed at the first time instance comprises applying a filter to a time series of a historical number of clients that were installed on the virtual machines of the one or more servers.

9. A method for processing audio/video (A/V) streams of a video conference at one or more servers, the method comprising:
   for each of a plurality of user endpoints of the video conference:
      receiving an A/V stream;
      determining whether the A/V stream is in a format that is compatible with a media mixer;
      if the A/V stream is in a format compatible with the media mixer, not transcoding the A/V stream;
      otherwise, if the A/V stream is not in a format compatible with the media mixer, transcoding the A/V stream, the transcoding comprising:
         determining a media provider associated with the A/V stream;

determining whether an application software development kit (SDK) from the media provider is available at the one or more servers;

if the application SDK from the media provider is available, decoding the A/V stream using the application SDK from the media provider, otherwise, if the application SDK from the media provider is not available, decoding the A/V stream using a client application from the media provider, the client application executing at a virtual machine instantiated on the one or more servers; and encoding the decoded A/V stream into a format compatible with the media mixer, wherein each of the virtual machines instantiated on the one or more servers only executes a single client application;

composing, at the media mixer, a plurality of ones of the transcoded A/V streams and the not transcoded A/V streams into one composite A/V stream; and encoding the composite A/V stream into a format that is compatible with one of the user endpoints, wherein load prediction is employed to minimize a number of virtual machines that are instantiated on the one or more servers at any time instance, the load prediction comprising:

predicting a first number of client applications that will be needed at a first time instance to decode the A/V streams received at the one or more servers;

before the first time instance, (i) deploying the first number of virtual machines on the one or more servers, and (ii) installing the first number of client applications, one on each of the deployed virtual machines;

at the first time instance, determining whether an additional number of client applications are needed to decode the A/V streams, the additional number of client applications in excess of the first number of client applications; and if an additional number of client applications are needed, (i) deploying a corresponding number of additional virtual machines on the one or more servers, and (ii) installing the additional number of client applications, one on each of the additional virtual machines.

10. A method for incorporating one or more web-based media sources into a video conference, the method comprising:

for each of the one or more web-based media sources:

receiving a media signal from the web-based media source;

virtually rendering the media signal using a browser executing on a virtual machine instantiated on one or more servers;

capturing one or more of an audio stream, a video stream and an image associated with the virtually rendered media signal; and encoding one or more of the captured audio stream, the captured video stream and the captured image into a format compatible with a media mixer, wherein each of the virtual machines instantiated on the one or more servers only executes a single browser;

composing, at the media mixer, one or more of the encoded audio streams, the encoded video stream and the encoded images with one or more audio and video (A/V) streams associated with user endpoints of the video conference to form a composite A/V stream; and encoding the composite A/V stream into a format that is compatible with one of the user endpoints, wherein load prediction is employed to minimize a number of virtual machines that are instantiated on the one or more servers at any time instance, the load prediction comprising:

predicting a first number of browsers that will be needed at a first time instance to virtually render the media signals received at the one or more servers;

before the first time instance, (i) deploying the first number of virtual machines on the one or more servers, and (ii) installing the first number of browsers, one on each of the deployed virtual machines;

at the first time instance, determining whether an additional number of browsers are needed to decode the A/V streams, the additional number of browsers in excess of the first number of browsers; and if an additional number of browsers is needed, (i) deploying a corresponding number of additional virtual machines on the one or more servers, and (ii) installing the additional number of browsers, one on each of the additional virtual machines.

\* \* \* \* \*